United States Patent
Chainer et al.

(10) Patent No.: US 6,411,453 B1
(45) Date of Patent: Jun. 25, 2002

(54) METHODS, APPARATUS AND PROGRAM PRODUCTS FOR DETERMINING OFF-TRACK TIME SHAFT ESTIMATES TO BE USED IN WRITING TIMING PATTERNS ON A STORAGE MEDIUM

(75) Inventors: Timothy Joseph Chainer, Mahopac; Mark Delorman Schultz, Elmsford; Edward John Yarmchuk, Mahopac, all of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/145,930

(22) Filed: Sep. 3, 1998

(51) Int. Cl.⁷ ................................................. G11B 5/09
(52) U.S. Cl. .............................. 360/51; 360/75; 360/76
(58) Field of Search ............................... 360/51, 75, 31, 360/48, 76, 77.02, 78.04, 77.07, 77.08

(56) References Cited

U.S. PATENT DOCUMENTS

| | | | |
|---|---|---|---|
| 4,414,589 A | 11/1983 | Oliver et al. | 360/77 |
| 4,879,608 A | 11/1989 | Sano | 360/51 |
| 4,912,576 A | 3/1990 | Janz | 360/77.07 |
| 5,229,901 A | 7/1993 | Mallary | 360/104 |
| 5,416,652 A | 5/1995 | Lewis | 360/48 |
| 5,448,429 A | 9/1995 | Cribbs et al. | 360/75 |
| 5,485,322 A | 1/1996 | Chainer et al. | 360/51 |
| 5,541,784 A | 7/1996 | Cribbs et al. | 360/75 |
| 5,570,247 A | 10/1996 | Brown et al. | 360/75 |
| 5,581,420 A | 12/1996 | Chainer et al. | 360/75 |
| 5,612,833 A | 3/1997 | Yarmchuk et al. | 360/75 |
| 5,615,058 A | 3/1997 | Chainer et al. | 360/51 |
| 5,668,679 A | 9/1997 | Swearingen et al. | 360/75 |
| 5,757,574 A | 5/1998 | Chainer et al. | |
| 5,901,003 A * | 5/1999 | Chainer et al. | 360/51 |
| 6,075,668 A * | 6/2000 | Chainer et al. | 360/51 |

FOREIGN PATENT DOCUMENTS

| | | | |
|---|---|---|---|
| JP | A-63 000872 | 9/1988 | G11B/21/10 |
| JP | A-04 023276 | 7/1992 | |
| WO | WO 94/11864 | 5/1994 | |

OTHER PUBLICATIONS

"Regenerative Clock Technique For Servo Track Writers," IBM Technical Disclosure Bulletin, vol. 33, No. 5, p. 310–311 (Oct. 1990).

* cited by examiner

Primary Examiner—Andrew L. Sniezek
(74) Attorney, Agent, or Firm—Heslin Rothenberg Farley & Mesiti P.C.

(57) ABSTRACT

Off-track time shift estimates are determined and used in order to write subsequent trigger patterns on a storage medium at different track pitches. Various procedures for determining an off-track time shift estimate are provided. These procedures include measuring time intervals between a related set of trigger patterns and another trigger written on the storage medium; measuring time intervals between a motor index and a particular trigger pattern at two different radial locations; measuring the difference in the center location of two trigger patterns written at different radial locations; and microjogging a recording transducer during the interval between two different trigger patterns.

46 Claims, 22 Drawing Sheets

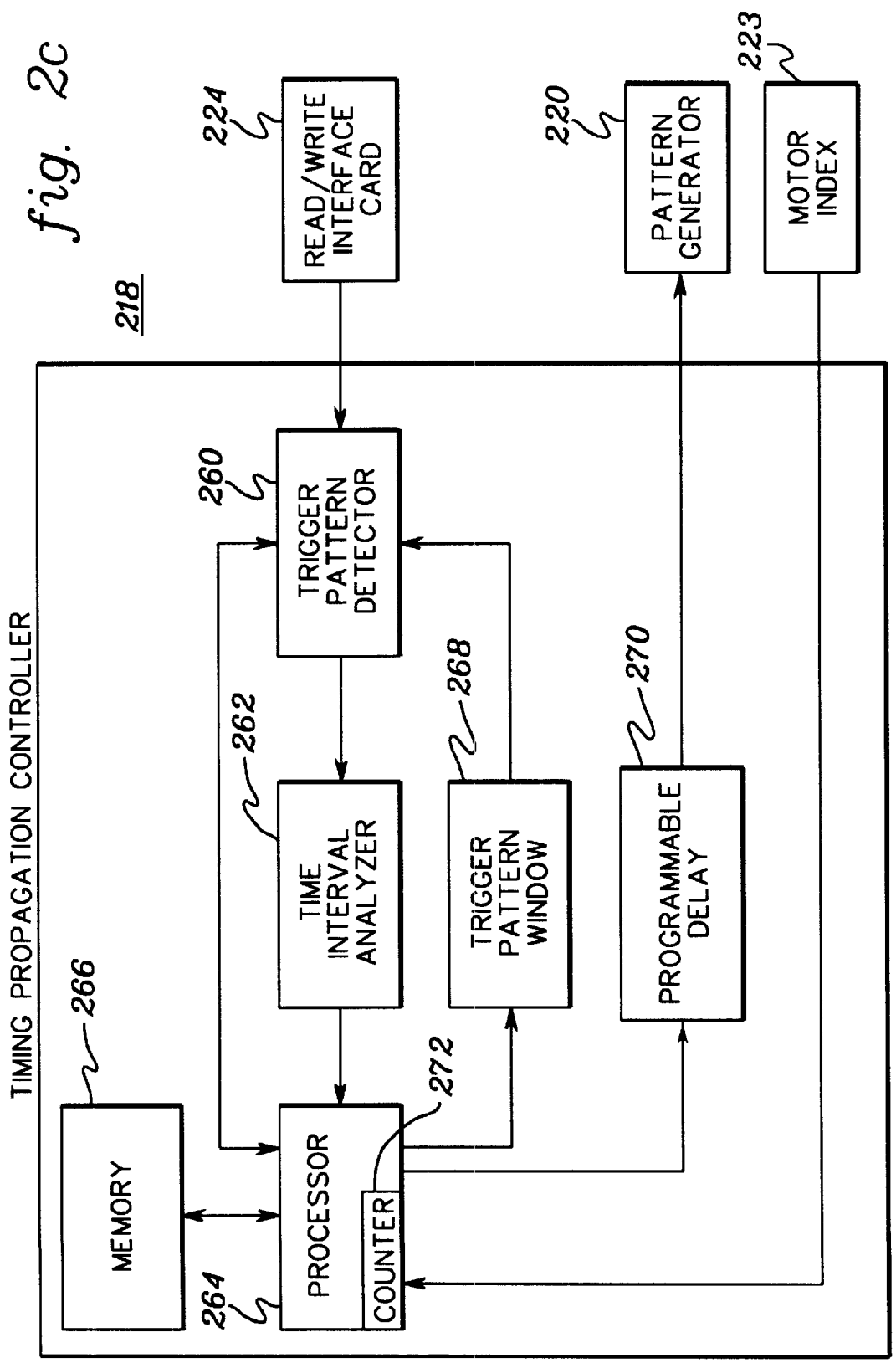

METHODS, APPARATUS AND PROGRAM PRODUCTS FOR DETERMINING OFF-TRACK TIME SHAFT ESTIMATES TO BE USED IN WRITING TIMING PATTERNS ON A STORAGE MEDIUM

CROSS-REFERENCE TO RELATED APPLICATIONS/PATENTS

Each of the below listed applications/patents is related to the present application and is hereby incorporated herein by reference in its entirety:

"Self-Servowriting System With Dynamic Error Propagation Reduction," by Chainer et al., Ser. No. 08/677,148, Filed: Jul. 9, 1996;

"Methods And Systems For Self-Servowriting Including Maintaining A Reference Level Within A Usable Dynamic Range," by Chainer et al., U.S. Pat. No. 5,757,574, Issued: May 26, 1998;

"Method And System For Determining A Radial Positioning Value Used For Writing Tracks At A Desired Track Pitch," by Chainer et al., U.S. Pat. No. 5,581,420, Issued: Dec. 3, 1996;

"Method And System For Writing A Clock Track On A Storage Medium," by Chainer et al., U.S. Pat. No. 5,485,322, Issued on Jan. 16, 1996;

"Method and Apparatus For Correcting For Random Errors In Timing Pattern Generation," by Chainer et al., Ser. No. 08/891,122, Filed: Jul. 10, 1997;

"Method And Apparatus For Correcting For Systematic Errors In Timing Pattern Generation," by Chainer et al., Ser. No. 08/882,396, Filed: Jul. 10, 1997;

"Trigger Pattern Detection Method And Apparatus," by Chainer et al., Ser. No. 08/891,282, Filed: Jul. 10, 1997;

"Improvements In Self-Servowriting Timing Pattern Generation," by Chainer et al., Ser. No. 08/628,910, Filed: Apr. 08, 1996; and "Radial Self-Propagation Pattern Generation For Disk File Servowriting," by Yarmchuk et al, U.S. Pat. No. 5,612,833, Issued: Mar. 18, 1997.

TECHNICAL FIELD

This invention relates, in general, to writing timing information on storage media and, in particular, to determining off-track time shift estimates used in the writing of the timing information.

BACKGROUND ART

There is a continuing desire to increase the amount of information that can be stored on various forms of storage media, including floppy and hard disks. One way of increasing the capacity of the storage media is by providing higher track densities. Higher track densities have been made possible by the advent of voice-coil and other types of servo positioners, as well as by the ability to read and write narrower tracks by using, for example, magnetoresistive (MR) head technology.

As technology advances to provide the increased track densities and smaller disk drives, there is an ever-increasing need for more accurately positioned timing information. It is this timing information that is used when writing product servo-patterns on the storage media.

In one example, timing information is provided by writing trigger patterns at various locations of the storage medium. However, in the past, as the trigger patterns were written, one or more systematic errors occurred, which affected the precise positioning of subsequent trigger patterns. In order to reduce the affects of those systematic errors, it is important to determine values for those errors, so they may be taken into consideration when writing trigger patterns.

Based on the foregoing, a need exists for a capability that provides techniques for determining a systematic error. In particular, a need exists for a capability to determine a specific type of systematic error, referred to as an off-track time shift.

SUMMARY OF THE INVENTION

The shortcomings of the prior art are overcome and additional advantages are provided through the provision of a method of determining off-track time shift estimates. In one instance, the method includes measuring, at one radial position, a first time interval between a selected criterion and a trigger pattern written on a storage medium; measuring, at another radial position, a second time interval between the selected criterion and the trigger pattern; and determining an off-track time shift estimate using the first time interval and the second time interval.

In one example, the off-track time shift estimate is used to write subsequent trigger patterns on the storage medium.

Further, in one example, the selected criterion includes a plurality of trigger patterns written on the storage medium. The plurality of trigger patterns have a predefined relationship with one another.

As another example, the selected criterion includes a motor index of a storage device. The storage device includes the storage medium.

In yet another example, the selected criterion is another trigger pattern written on the storage medium at a desired radial position. The another trigger pattern and the trigger pattern are, in one instance, written at the same radial position. However, in another instance, they are written at different radial positions.

In another aspect of the present invention, a method of determining off-track time shift estimates is provided. The method includes, for instance, measuring, at a radial position, a first time interval between a first trigger pattern written On a storage medium and a second trigger pattern written on the storage medium; measuring, at the radial position, a second time interval between the second trigger pattern and a third trigger pattern written on the storage medium; and determining an off-track time shift estimate using the first time interval and the second time interval.

In a further aspect of the present invention, an apparatus for determining off-track time shift estimates is provided. The apparatus includes, for example, a measuring unit adapted to measure, at one radial position, a first time interval between a selected criterion and a trigger pattern written on a storage medium. The measuring unit is further adapted to measure, at another radial position, a second time interval between the selected criterion and the trigger pattern. Further, the apparatus includes a computing unit adapted to determine an off-track time shift estimate using the first time interval and the second time interval.

In another aspect of the present invention, an apparatus for determining off-track time shift estimates is provided. The apparatus includes, for instance, a measuring unit adapted to measure, at a radial position, a first time interval between a first trigger pattern written on a storage medium and a second trigger pattern written on the storage medium. Further, the measuring unit is adapted to measure, at the radial position, a second time interval between the second trigger pattern and a third trigger pattern written on the storage medium. The apparatus further includes a computing unit adapted to determine an off-track time shift estimate using the first time interval and the second time interval.

In yet a further aspect of the present invention, an apparatus for determining off-track time shift estimates is provided. The apparatus includes, for example, means for measuring, at one radial position, a first time interval between a selected criterion and a trigger pattern written on a storage medium; means for measuring, at another radial position, a second time interval between the selected criterion and the trigger pattern; and means for determining an off-track time shift estimate using the first time interval and the second time interval.

In another embodiment, an apparatus for determining an off-track time shift estimate is provided. The apparatus includes, for example, means for measuring, at a radial position, a first time interval between a first trigger pattern written on a storage medium and a second trigger pattern written on the storage medium; means for measuring, at the radial position, a second time interval between the second trigger pattern and a third trigger pattern written on the storage medium; and means for determining an off-track time shift estimate using the first time interval and the second time interval.

In yet another aspect of the invention, an article of manufacture is provided. The article of manufacture includes at least one computer usable medium having computer readable program code means embodied therein for causing the determining of off-track time shift estimates. The computer readable program code means in the article of manufacture includes, for example, computer readable program code means for causing a computer to measure, at one radial position, a first time interval between a selected criterion and a trigger pattern written on a storage medium; computer readable program code means for causing a computer to measure, at another radial position, a second time interval between the selected criterion and the trigger pattern; and computer readable program code means for causing a computer to determine an off-track time shift estimate using the first time interval and the second time interval.

In yet another aspect of the present invention, an article of manufacture is provided. The article of manufacture includes at least one computer usable medium having computer readable program code means embodied therein for causing the determining of off-track time shift estimates. The computer readable program code means in the article of manufacture includes, for instance, computer readable program code means for causing a computer to measure, at a radial position, a first time interval between a first trigger pattern written on a storage medium and a second trigger pattern written on the storage medium; computer readable program code means for causing a computer to measure, at the radial position, a second time interval between the second trigger pattern and a third trigger pattern written on the storage medium; and computer readable program code means for causing a computer to determine an off-track time shift estimate using the first time interval and the second time interval.

The present invention advantageously reduces pattern slew when writing trigger patterns on a storage medium. Further, the use of the present invention enables different track pitches to be used when writing the trigger patterns. This advantageously increases the speed at which trigger patterns can be written. As one example, an off-track time estimate can be determined within 3,500 of 18,000 track steps. Once the estimate is determined, the stepping rate can be doubled for the creation of the necessary servo-patterns of the storage medium.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be apparent from the following detailed description taken in conjunction with the accompanying drawings in which:

FIG. 2c depicts one example of a timing propagation controller of FIG. 2a, in accordance with the principles of the present invention;

BEST MODE FOR CARRYING OUT THE INVENTION

In accordance with the principles of the present invention, off-track time shift estimates are determined, which are used in writing timing information (e.g., trigger patterns) on a storage medium. In particular, the off-track time shift estimates are used in order to adjust for trigger pattern slew when shifting from one propagation pitch to another. Off-track time shifts are considered a type of systematic error. Systematic errors have the characteristic of being constant in the sectors of a storage medium.

Figure 1:
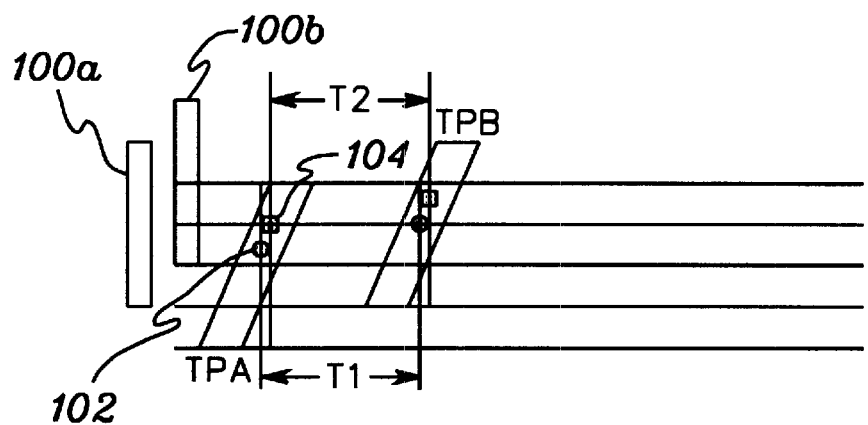
FIG. 1 illustrates a shifting of the centers of a trigger pattern demonstrating a problem addressed by the present invention.

An off-track time shift occurs, for example, when there is read to write non-parallelism (i.e., the read element is perpendicular to a track direction, but the trigger pattern it is reading is not perpendicular to the track direction) or with misaligned head mounts. In particular, the time shift is a result of a shift in the geometric centers of a trigger pattern, when a trigger pattern is read at two different radial locations. For example, when a read element 100a (FIG. 1) is located at a ¼ track position, it detects the center of Trigger Pattern A (TPA) at 102. (Note that TPA is non-parallel to read element 100a.) However, when the read element is moved to a ½ track position (read element 100b), it detects the center of Trigger Pattern A at 104. Thus, there is a shift in the center of the trigger pattern, which results in a pattern rotation.

Such a shift cannot be determined by taking a time measurement between two trigger patterns, TPA and TPB, because the centers of both trigger patterns shift equally. Thus, measurement T1, taken when read element 100a is at the ¼ track position, is equal to time T2, taken when read element 100b is at the ½ track position. Therefore, there is no detection of an off-track time shift.

The present invention addresses the above problem by providing techniques for determining an off-track time shift estimate.

The capabilities of the present invention are included in and used by a self-servowrite apparatus, which writes various types of patterns on one or more storage medium coupled to the apparatus. These patterns include radial propagation burst patterns, trigger patterns and product servo-patterns.

The radial propagation burst patterns provide radial information to move the actuator inwards while servoing on the edge of the tracks of a storage medium. Trigger patterns are used to derive precise timing or circumferential information for use in writing product servo-patterns on the storage media. The product servo-patterns are written using the radial and trigger patterns. In particular, the radial and trigger patterns are used to precisely line up the product servo-patterns track to track on one or more storage medium. Each of the written patterns consists of a burst of one or more transitions (e.g., magnetic transitions).

Figure 2A:
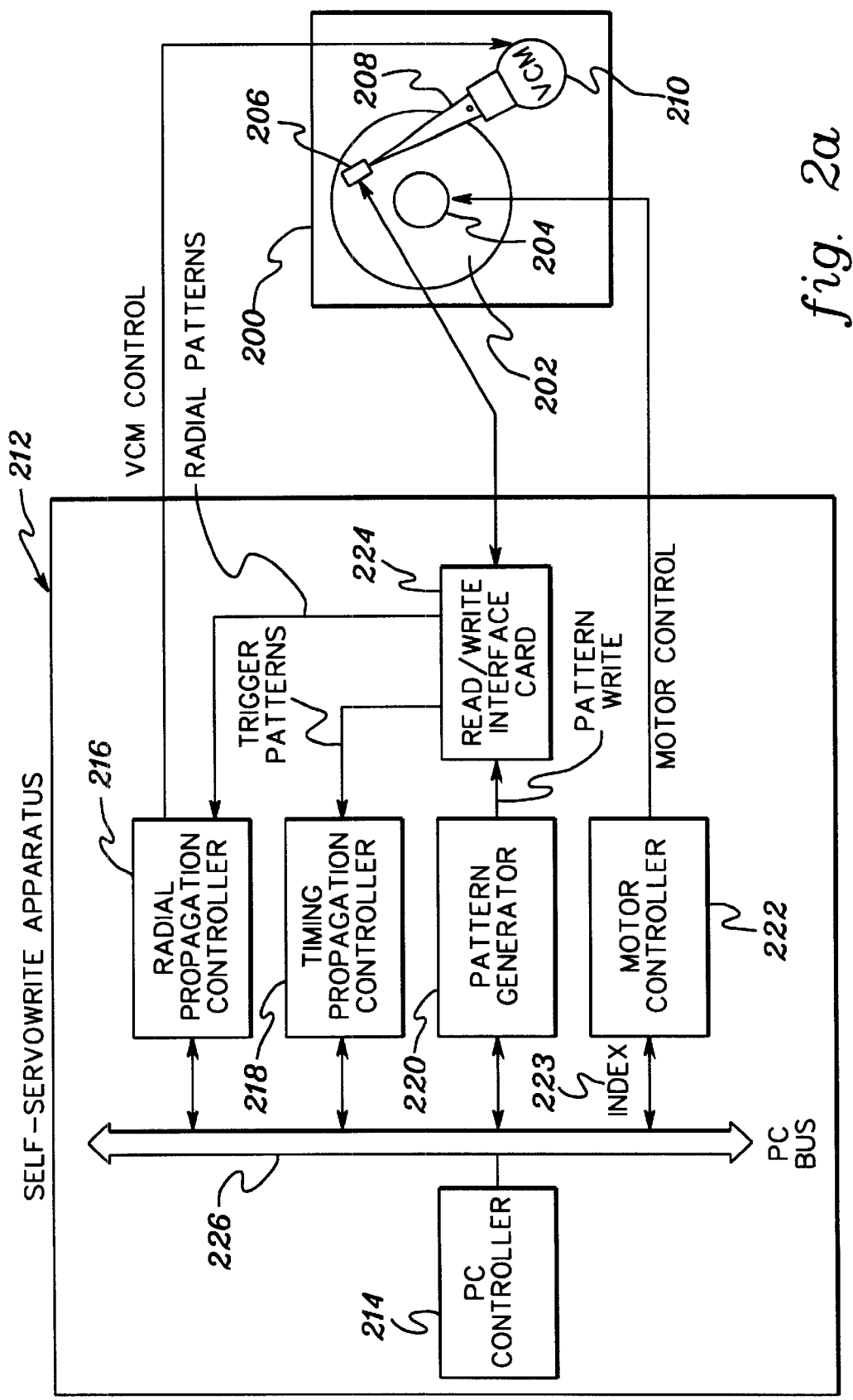
FIG. 2a depicts one example of a self-servowrite apparatus incorporating and using the capabilities of the present invention.

The storage media, in which the patterns are written, are located, for instance, in a storage device coupled to a self-servowrite apparatus. One example of such a storage device is depicted in FIG. 2a.

Storage device 200 is, for instance, a disk storage device, which includes one or more storage medium 202, such as storage disks. Each storage medium has, for instance, a plurality of circumferential tracks and each track is partitioned into a plurality of sectors. The storage media rotate via a motor 204, which is also located within storage device 200. Information is written to or read from the storage media using a recording head or transducer 206 of storage device 200.

Transducer 206 can either have a single read/write element or separate read/write elements. The separate read/write elements are physically apart by some distance. One example of transducers having separate read/write heads includes a magnetoresistive (MR) read transducer and an inductive write transducer.

Transducer 206 is coupled to an actuator 208, which is another component of storage device 200. Actuator 208 is used in moving the transducer radially along the storage media. The actuator is driven by a voice coil motor 210 coupled thereto.

Storage device 200 is coupled to and controlled by a self-servowrite apparatus 212. In one embodiment, self-servowrite apparatus 212 includes a PC controller 214, a radial propagation controller 216, a timing propagation controller 218, a pattern generator 220, a motor controller 222 and a read/write interface card 224, each of which is described in detail below.

PC controller 214 is a standard personal computer (such as, for instance, an Aptiva Model 2176 offered by International Business Machines Corporation), which is coupled to other components of the self-servowrite apparatus via a system bus 226. In one example, the system bus conforms to ISA standards and enables communication among the PC controller and the other components of the apparatus, as well as between the components themselves. The bus allows addressing and control of the other components by the PC controller. In another example, the bus can be eliminated and each of the components can communicate directly.

Coupled to bus 226 is radial propagation controller 216, which is used to control the writing of radial propagation bursts on storage media 202. In particular, the radial propagation controller reads previously written propagation bursts, along a track on the storage media, and positions the transducer to write subsequent propagation bursts on a next track. The radial propagation controller also controls the writing of the initial set of propagation bursts.

One example of a radial propagation controller is described with reference to FIG. 2b. In one example, radial propagation controller 216 includes an amplitude demodulator 240, which receives as input readback signals from read/write interface card 224. The read/write interface card, which is described in further detail below, receives its signals from recording transducer 206. The amplitude demodulator converts the readback signals to a position signal, which is input to an analog/digital (A/D) converter 242. The converter converts the analog signal to digital representation and sends the value to a processor 244 (e.g., a digital processor, such as a TMS 320 offered by Texas Instruments), which processes the signal.

In particular, the processor calculates the error in the present transducer position from the desired position and outputs a correction value to a digital to analog converter (DAC) 246. DAC 246 converts the correction value into an analog signal, which is input to a voice coil motor (VCM) driver 248. The VCM driver converts the analog voltage signal into a current, which drives actuator 208 to move transducer 206.

Returning to FIG. 2a, in addition to radial propagation controller 216, timing propagation controller 218 is also coupled to system bus 226. The timing propagation controller controls the writing of trigger patterns on a given track of a storage medium. In particular, it reads trigger patterns on one track and writes subsequent trigger patterns on a next track. Further, it controls the writing of the initial trigger patterns.

One example of a timing propagation controller is described with reference to FIG. 2c. In one example, timing propagation controller 218 includes a trigger pattern detector 260, a time interval analyzer 262, a processor 264, one or more memory units 266 coupled to processor 264, a trigger pattern window 268 and a programmable delay 270, each of which is described below.

Trigger pattern detector 260 receives as input readback trigger patterns, which are output from read/write interface card 224, and converts the readback trigger patterns into a digital signal. The digital signal is then input to a measuring unit, such as, for example, time interval analyzer 262.

Time interval analyzer 262 precisely measures the time between trigger patterns. In one example, time interval analyzer 262 is a HP 5372A offered by Hewlett Packard. In another example, time interval analyzer 262 includes, for instance, a 5 MHz clock, a counter, and a voltage ramp. The counter is coupled to the clock and counts the clock cycles. The voltage ramp, which is also coupled to the counter, interpolates between the clock cycles (e.g., the counts of the counter) to obtain a time measurement. (Measuring units other than those described above may also be used, as further examples, to measure time between trigger patterns, without departing from the spirit of the present invention.) The measured time is output from analyzer 262 and input to processor 264.

In one example, processor 264 is a digital processor (e.g., a TMS 320 offered by Texas Instruments), which stores the information received from analyzer 262, as well as other components of controller 218, in memory 266. Processor 264 includes the logic used to perform many of the calculations and determinations used in the present invention, as described below with reference to the flow diagrams. For example, the processor is used to calculate the off-track time shift estimate used to shift the location of a subsequent pattern generator output to write a subsequent trigger pattern.

In one example, the processor controls the opening of trigger pattern window 268 at a desired time, which enables the trigger pattern detector at the desired times, such that the incidences of false triggers are reduced.

In addition to the above, controller 218 includes programmable delay 270, which receives its input from processor 264. Processor 264 uses the time measurements provided by time analyzer 262 to calculate a shift value, which is input to programmable delay 270. The shift value is used to shift the writing of the product servo-patterns. The programmable delay provides the shifted signals (e.g., in time) to pattern generator 220.

An input to processor 264 is motor index 223. In particular, the motor index is input to a counter 272 within the processor. The counter measures the time between the index and a first trigger pattern. When the motor index comes in, the counter starts counting until the next trigger pattern is detected.

Referring back to FIG. 2a, self-servowrite apparatus 212 also includes pattern generator 220. Pattern generator 220 writes various patterns stored in its memory, including, for instance, radial propagation burst patterns, trigger patterns and product servo-patterns.

In one example, in order to write a track of product servo-patterns, the radial propagation controller instructs the pattern generator to write a sequence of radial bursts on a track of a storage medium via read/write interface card 224. The read/write interface card provides a signal to the transducer to write patterns on the storage media. Further, the timing propagation controller controls the pattern generator to write product servo-patterns at specified locations.

Although the pattern generator is depicted as a separate component within the self-servowrite apparatus, it can be a part of other components, such as, for instance, the radial propagation controller and/or the timing propagation controller.

The output of pattern generator 220 (e.g., a stored pattern) is, for example, input to read/write interface card 224, which generates one or more signals representative of the stored pattern. The signals are input to recording head 206, which writes the signals on one or more of storage media 202.

In addition to the above, self-servowrite apparatus 212 includes motor controller 222 used to rotate storage media 202 and to derive an index pulse 223 from motor 204 of the storage device.

Described above is one example of a self-servowrite apparatus coupled to a storage device. The self-servowrite apparatus and/or the storage device may include additional, less and/or different components than that described above without departing from the spirit of the present invention. For instance, one processor may be used to perform the operations of PC controller 214, processor 244 and/or processor 264. Alternatively, a plurality of processors may be employed to perform the functions of one or more of the above-described processors. For example, processor 264 may include one or more processors (referred to as a processing unit).

Further, one or more timing propagation controllers may be used to perform the functions provided by timing propagation controller 218. These one or more controllers form a controlling unit. Similarly, one or more radial propagation controllers may be used to perform the functions provided by radial propagation controller 216. Again, the one or more controllers form a controlling unit. It is also possible that the functions of the radial and timing propagation controllers can be combined into one or more controllers, which also can be referred to as a controlling unit.

Figure 2B:
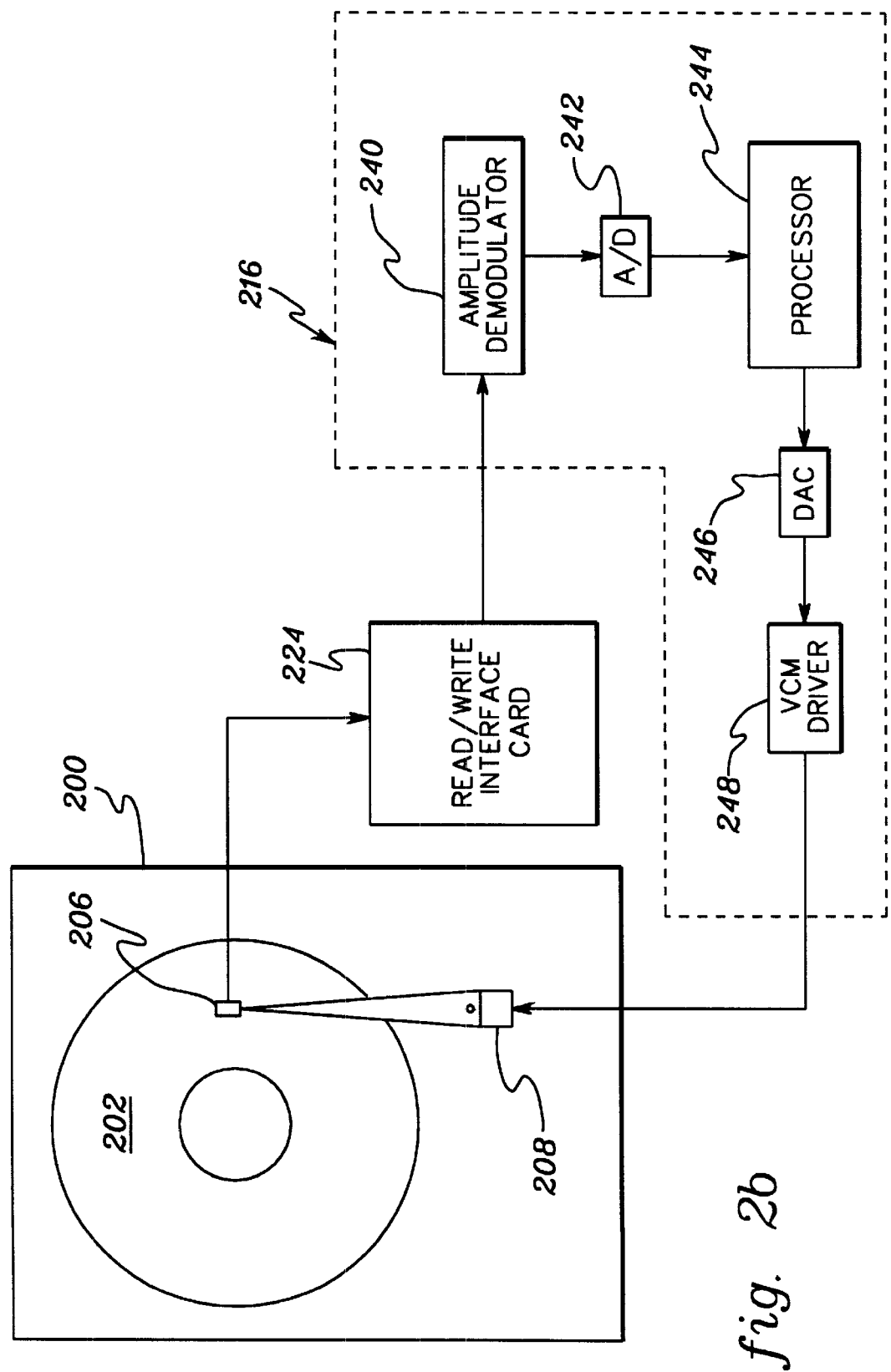
FIG. 2b depicts one example of a radial propagation controller of FIG. 2a, in accordance with the principles of the present invention.

The self-servowrite apparatus of FIGS. 2a–2c is used, in accordance with the principles of the present invention, to determine values for systematic errors. In particular, the self-servowrite apparatus is used for determining an off-track time shift estimate used to reduce timing pattern slew at a subsequent propagation pitch using data available before, during, or as a result of propagation at an initial propagation pitch. One cause of pattern slew, in timing propagation, results from the systematic difference in on-track (transducer not moved after write) and off-track (transducer moved some predetermined fraction of a track width) trigger position. Other causes of pattern slew result from head/disk geometry and/or magnetic effects or from signal amplitude dependent time shifts in the trigger pattern detection system.

Figure 3:
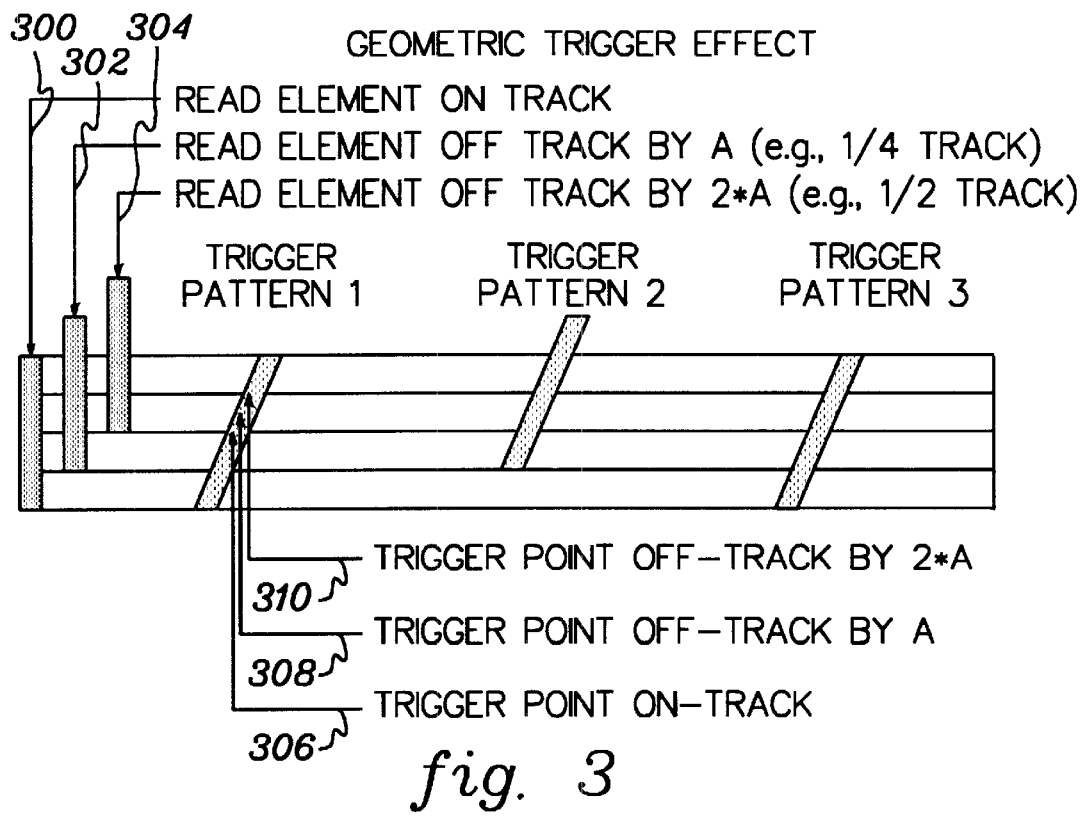
FIG. 3 illustrates a geometric trigger effect, which contributes to an off-track time shift.

One example of a geometric effect which contributes to off-track time shift is depicted in FIG. 3. Shown in FIG. 3 is a read element of transducer 206 that is placed at various positions, including on-track (300), off-track by a predefined amount (e.g., one-quarter track) (302), and off-track by two times the predefined amount (e.g., one-half track) (304). Also shown are three written trigger patterns: Trigger Pattern 1, Trigger Pattern 2, and Trigger Pattern 3.

With reference to Trigger Pattern 1, arrow 306 indicates where the center of the trigger pattern is with respect to on-track read element 300 (i.e., where the read element detects the position of the trigger pattern). Similarly, arrow 308 indicates where the center of the trigger pattern is with respect to read element 302. As can be seen, the center of the trigger pattern designated by arrow 308 is shifted in time. That is, it is to the right of the center designated by arrow 306. Likewise, arrow 310 indicates where the center of the trigger pattern is with respect to read element 304, and this center is also shifted in time.

Figure 4:
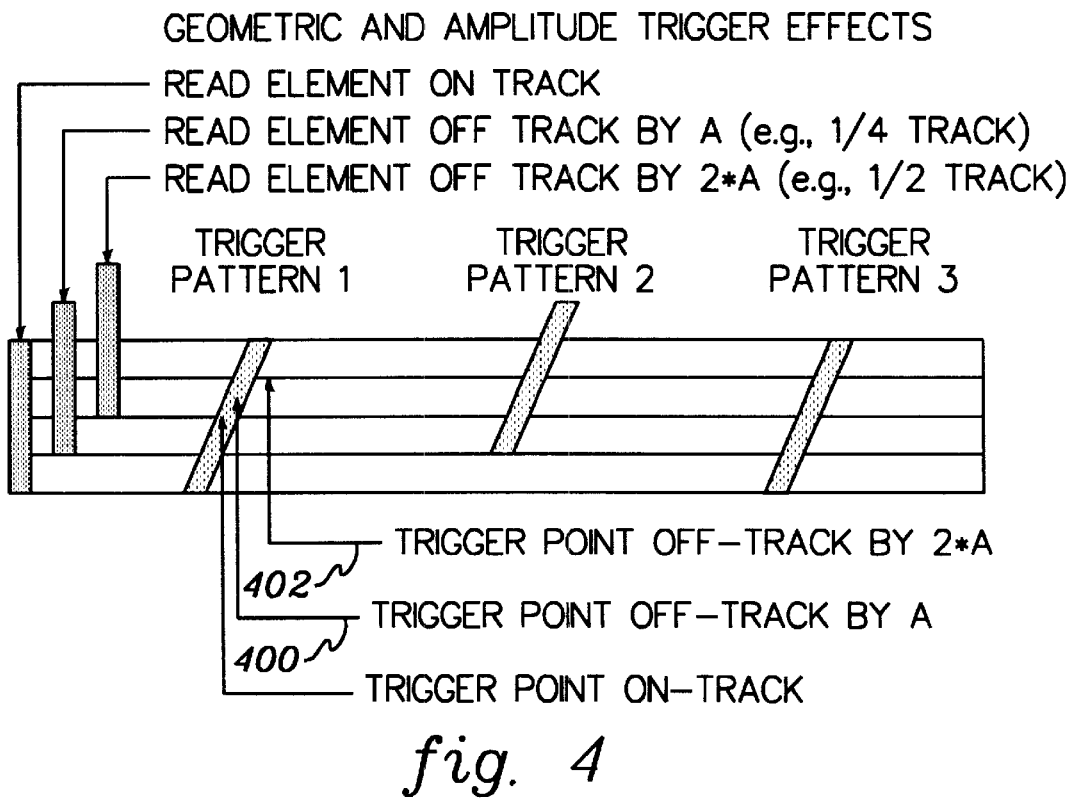
FIG. 4 illustrates geometric and amplitude dependent trigger effects, which contribute to an off-track time shift.

The geometric effect of FIG. 3 may be compounded by amplitude dependent time shifts in the detection process, which is depicted in FIG. 4. In FIG. 4, it can be seen that the centers indicated by arrows 400 and 402 are more shifted in time than the centers depicted by arrows 308 and 310. Thus, showing that the geometric effect is worsen by amplitude dependent time shifts.

Figure 5:
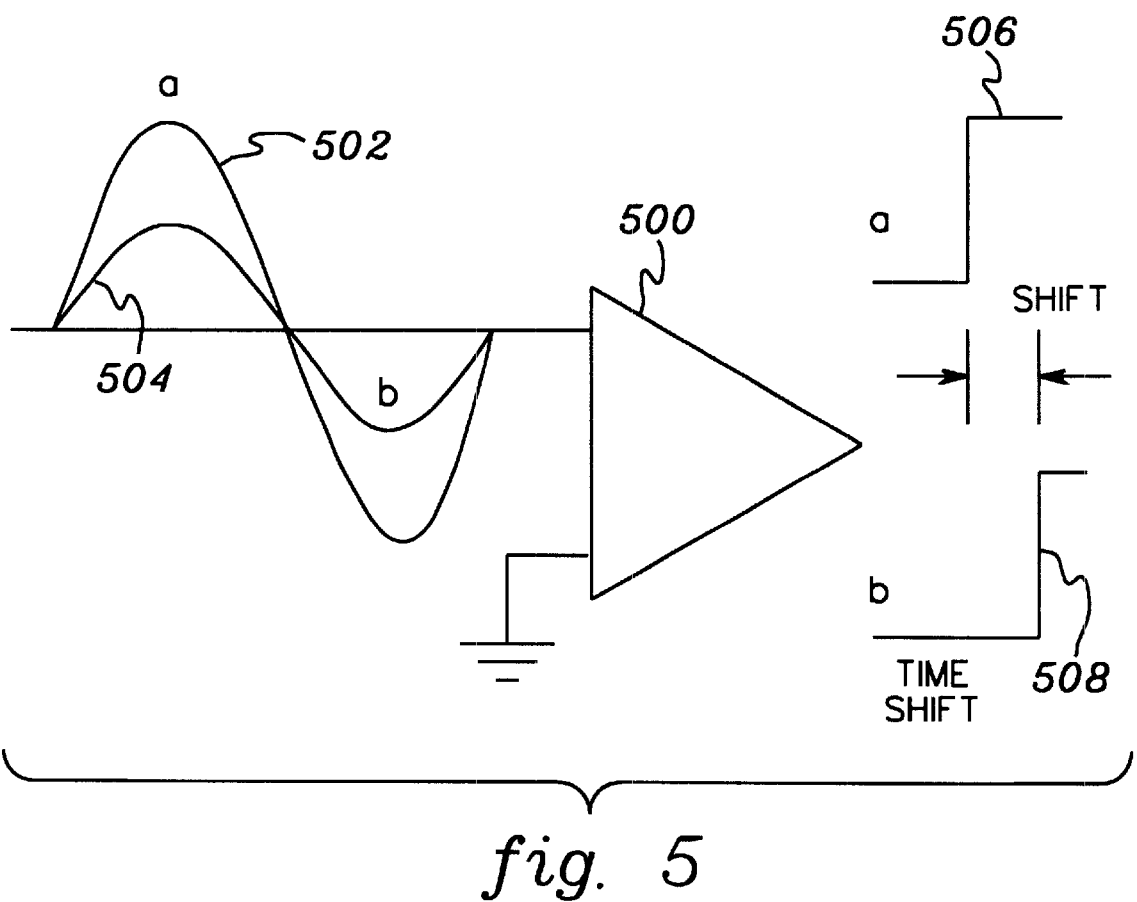
FIG. 5 illustrates a cause for the amplitude dependent time shift of FIG. 4.

A cause for the amplitude dependent time shift of FIG. 4 is described with reference to FIG. 5. Depicted in FIG. 5 is a comparator 500, which has as input an amplitude signal 502 (representative of a trigger pattern) and another amplitude signal 504 (representative of another trigger pattern). When comparator 500 detects the zero crossing of signal 502, the comparator fires producing a digital pulse 506. Similarly, when comparator 500 detects the zero crossing of signal 504, the comparator fires producing a digital pulse 508. Pulse 508 is shifted in time from pulse 506, as shown in FIG. 5. This small shift in time (e.g., one nanosecond) is referred to as an amplitude dependent time shift.

In accordance with the principles of the present invention, the shift in time of the centers of the trigger pattern can be compensated for by taking into consideration the off-track time shift estimate, when moving from one track pitch (e.g., one-quarter) to another track pitch (e.g., one-half). Thus, various techniques are provided herein for determining off-track time shift estimates. Each of these techniques is described in detail below.

One embodiment for determining an off-track time shift estimate is described in detail with reference to FIG. 6. In this embodiment, the existence of previously written trigger patterns is relied upon. The trigger patterns have a predefined relationship with one another (hereinafter, referred to as a related set of trigger patterns). For instance, the trigger patterns are written such that the time measured between each trigger pattern and an inertial frame index (e.g., a motor index) is substantially constant. For a linear actuator, the result is a substantially straight line of trigger patterns relative to the inertial frame. For a rotary actuator, the result is an arc of trigger patterns that matches the arc of motion of the transducer relative to the inertial frame.

Figure 6:
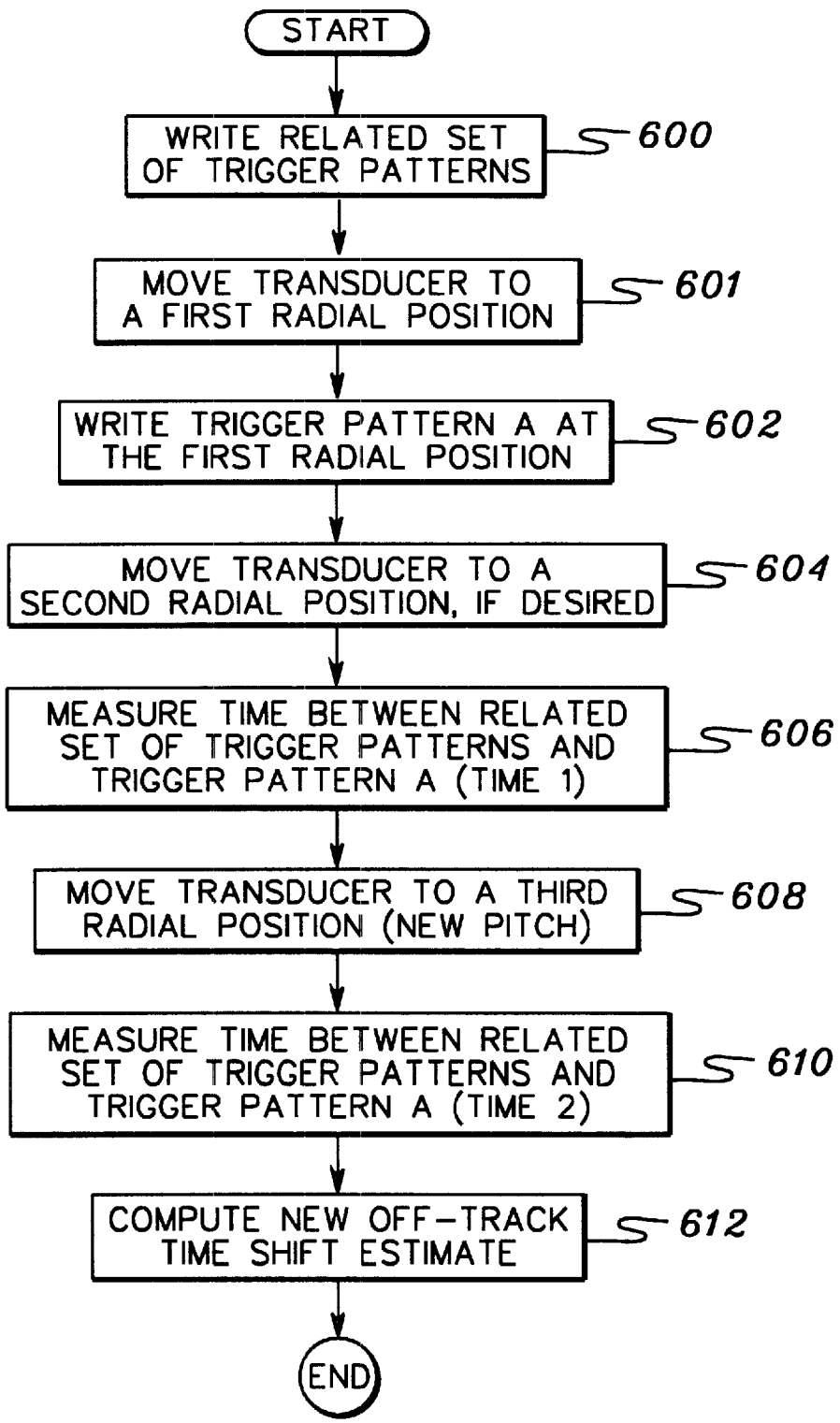
FIG. 6 depicts one embodiment of the logic used to determine an off-track time shift estimate, in accordance with principles of the present invention.

Referring to FIG. 6, initially, a related set of trigger patterns is written, STEP 600. In one example, in order to write the related set of trigger patterns, a plurality of trigger patterns are written circumferentially around a storage medium at one radial location. These trigger patterns are sequentially numbered starting at zero. Triggering on the odd numbered trigger patterns, even numbered trigger patterns are written circumferentially around the storage medium at another radial location (e.g., one-quarter track away). (To trigger on a trigger pattern, the read element reads over the trigger pattern, and the trigger pattern is detected by trigger pattern detector 260. Detector 260 produces a digital output representing the trigger pattern.) Then, triggering on the even numbered trigger patterns, odd numbered trigger patterns are written circumferentially around the storage medium at that same radial location. Thereafter, the transducer is moved to a new radial location (step size is still one-quarter track), and the process continues until a related set of trigger patterns, having a desired radial length, is produced. As one example, the desired radial length includes writing trigger patterns at enough radial steps (e.g., 1,000 radial steps) to cover the range in which a change in the track pitch may occur. One thousand steps is only one example. A related set of trigger patterns can include more or less than the 1,000 radial steps. Further details for writing a related set of trigger patterns is described below with reference to FIGS. 7–15.

Continuing with FIG. 6, subsequent to writing the related set of trigger patterns on the storage medium, actuator 208 moves transducer 206 to a desired radial position of the storage medium, referred to herein as a first radial position, STEP 601. The first radial position can be any radial position in which a portion of the related set of trigger patterns can still be read. At the first radial position, a trigger pattern (referred to herein as TP A) is written by pattern generator 220, STEP 602. In particular, the pattern generator writes a burst of one or more transitions on the storage medium with the transducer located at the first radial position.

Thereafter, transducer 206 may be moved to a second radial position, STEP 604. Specifically, if the second radial position is different from the first radial position, then the transducer is moved to the second radial position using, for instance, actuator 208. This second radial position may be different from the first radial position, but trigger pattern A would still be able to be read from that new radial position. If the first and second radial positions are the same, then the transducer need not be moved.

Next, the time between the line of trigger patterns and TP A is measured to produce a value referred to herein as TIME 1, STEP 606. In particular, time interval analyzer 262 of timing propagation controller 218 measures, at the second (or first) radial position, the time difference between the related set of trigger patterns and TP A.

Subsequently, the transducer is moved to a third radial position, which is at a new propagation track pitch (e.g., a track pitch of one-half, instead of one-quarter track pitch used to propagate the trigger patterns of the related set), STEP 608. Although this track pitch is different, the third radial position still allows the reading of trigger pattern A.

After changing the track pitch, another measurement of time is taken between the related set of trigger patterns and TP A, STEP 610. The value of this measurement is stored within a variable referred to herein as TIME 2.

TIME 2 and TIME 1 are then used to compute the new off-track time shift estimate, STEP 612. In one example, the off-track time shift estimate is equal to TIME 1−TIME 2. This calculation is performed by processor 264, as one example.

As described in the above embodiment, a related set of trigger patterns is used in the process to determine the off-track time shift estimate. In a further example, a plurality of related sets of trigger patterns are written in a single revolution of the storage medium. As one example, the number of related sets that are written is equal to the number of sectors of the storage medium. Each of the related sets is separated circumferentially by a time delay. Additionally, a plurality of trigger patterns at the first radial position are also written and each of those is separated circumferentially by a time delay. Further, a plurality of measurements are taken between the lines of trigger patterns and the trigger patterns (e.g., a plurality of TIME 1) and an average of these measurements is taken to obtain an average TIME 1. The same is true for TIME 2, such that an average TIME 2 is obtained. Then, the off-track time shift estimate is calculated by subtracting the average TIME 2 from the average TIME 1.

One embodiment for determining a related set of trigger patterns is described in detail in, commonly assigned U.S. patent application No. 08/882,396 entitled "Method and Apparatus For Correcting For Systematic Errors in Timing Pattern Generation", Chainer et al. (YO994-252VA), filed Jul. 10, 1997, which is hereby incorporated herein by reference in its entirety. Further, it is described below with reference to FIGS. 7–15. In this particular embodiment, the trigger patterns are written in such a manner that systematic errors (e.g., errors due to spatially separate read and write elements of a recording head, or errors due to non-parallel read and write elements) and random errors (e.g., errors due to electronic trigger noise) are reduced.

Figure 7:
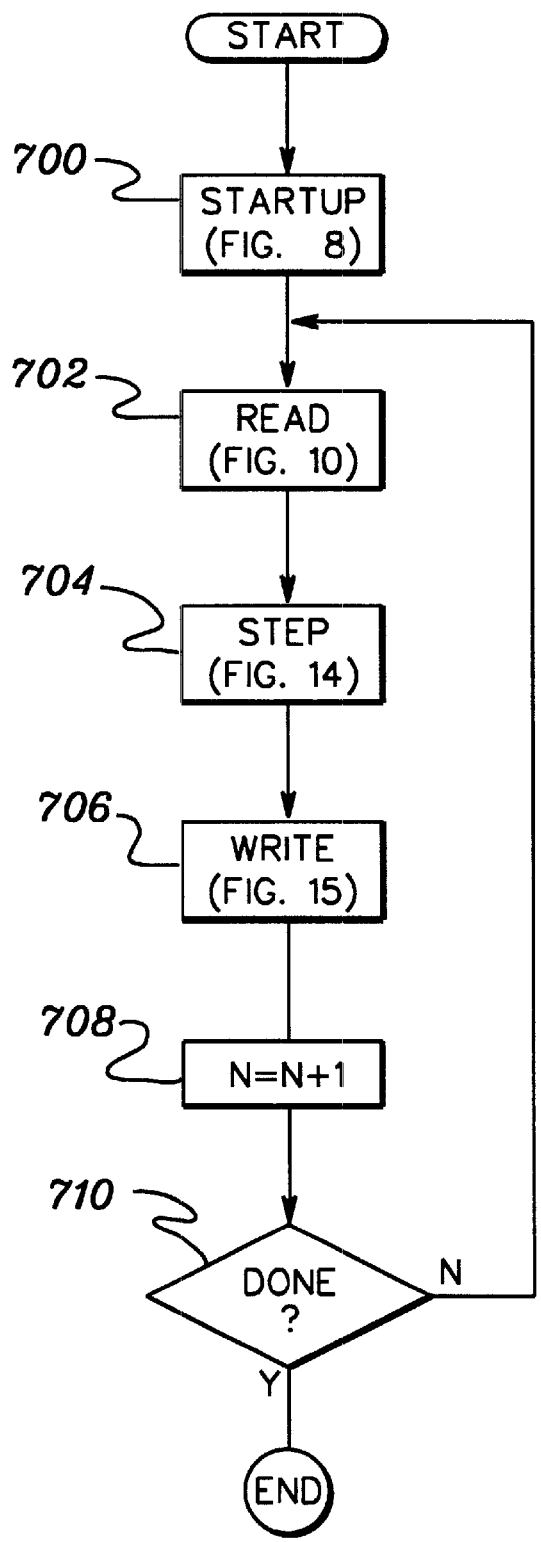
FIG. 7 depicts one example of a block diagram of the processes used to write a related set of trigger patterns, which is used in accordance with the principles of the present invention.

Referring to FIG. 7, initially a start-up procedure is implemented, which is used to initialize various variables to be used during the writing of the one or more related sets of trigger patterns, STEP 700. One example of a start-up procedure is described in detail with reference to FIG. 8.

Initially, a value of a read/write delay (systematic delay (SD0)) is measured, STEP 800. The read/write delay represents a delay due to the read to write separation of the read and write elements of the transducer, as well as an additional delay due to the electronics path in either or both of the read and write chains of the transducer.

In one example, the read/write delay is measured by using the following technique: A trigger pattern, TP 50, is written. Then, triggering on that trigger pattern on a subsequent revolution of the storage medium, a second trigger pattern, TP 52, is written at a time T54 later. Then, a measurement is taken of the actual time between the two trigger patterns, which is referred to as time T56. Thereafter, T56 is subtracted from T54 to obtain a measurement of the read/write delay ($RW_{Delay}$).

In addition to the above, a value for a target index time (IT), which represents the target interval between the index (e.g., the motor) and an initially written trigger pattern, is either measured or chosen, STEP 802. In one embodiment, IT is set to 50 microseconds.

Further, a value for a valid interval window (VI) is set equal to a valid interval window nominal value ($VI_{nominal}$), such as, for instance, 35 nanoseconds, STEP 804. The valid interval window is used as an error check; in particular, it defines how far away from the anticipated trigger location an actual measured trigger pattern can be to conclude that it is valid. Also, an estimate of a current index location (IS) is set to the target index time, which is updated as the technique proceeds along to the target, STEP 806.

In addition to the above, a number of other variables are initialized, STEP 808. In particular, a step value (N) is set equal to zero. In one example, there are 18,000 steps. Further, an index correction value is set equal to zero, as well as a half to full estimate (HFS) and a half to full correction (HFC). Additionally, a local average interval error (LAIE) is set to zero, as well as an integral algorithm correction (IAC) for all i. A trigger point valid flag is set to false for all of i and a value representing the number of equally spaced trigger patterns (Nint) is set equal to 90, as one example. As used herein, all index i are assumed to be modulo and can range from zero to Nint-1 (i.e., eighty-nine).

After the above values are initialized, an initial set of equally spaced trigger patterns (Nint) are written at intervals $TI_i$ with the initial trigger pattern being near the target index time with respect to the index, STEP 810. All $TI_i$ are equal to the target average interval (TAI) to start with, which is the nominal revolution time divided by the number of intervals in a revolution.

Subsequently, a measured interval ($MI_0$) is measured at trigger pattern zero using, for instance, a time interval analyzer, STEP 812, and a variable referred to as TS (time slip) is set to zero, STEP 814. This value represents an error handling variable that keeps track of the magnitude of the error in an erroneous trigger. This logic assumes the existence of hardware, which generates a fake trigger pattern if a valid or erroneous trigger pattern is not received within a specified time; i.e., trigger patterns valid, erroneous or fake are generated near every anticipated trigger pattern location. In the beginning, it is assumed there are no errors and therefore, TS is set to zero. Thereafter, an interval (MI) is measured at trigger pattern 1, STEP 816, as described in detail below.

Figure 9:
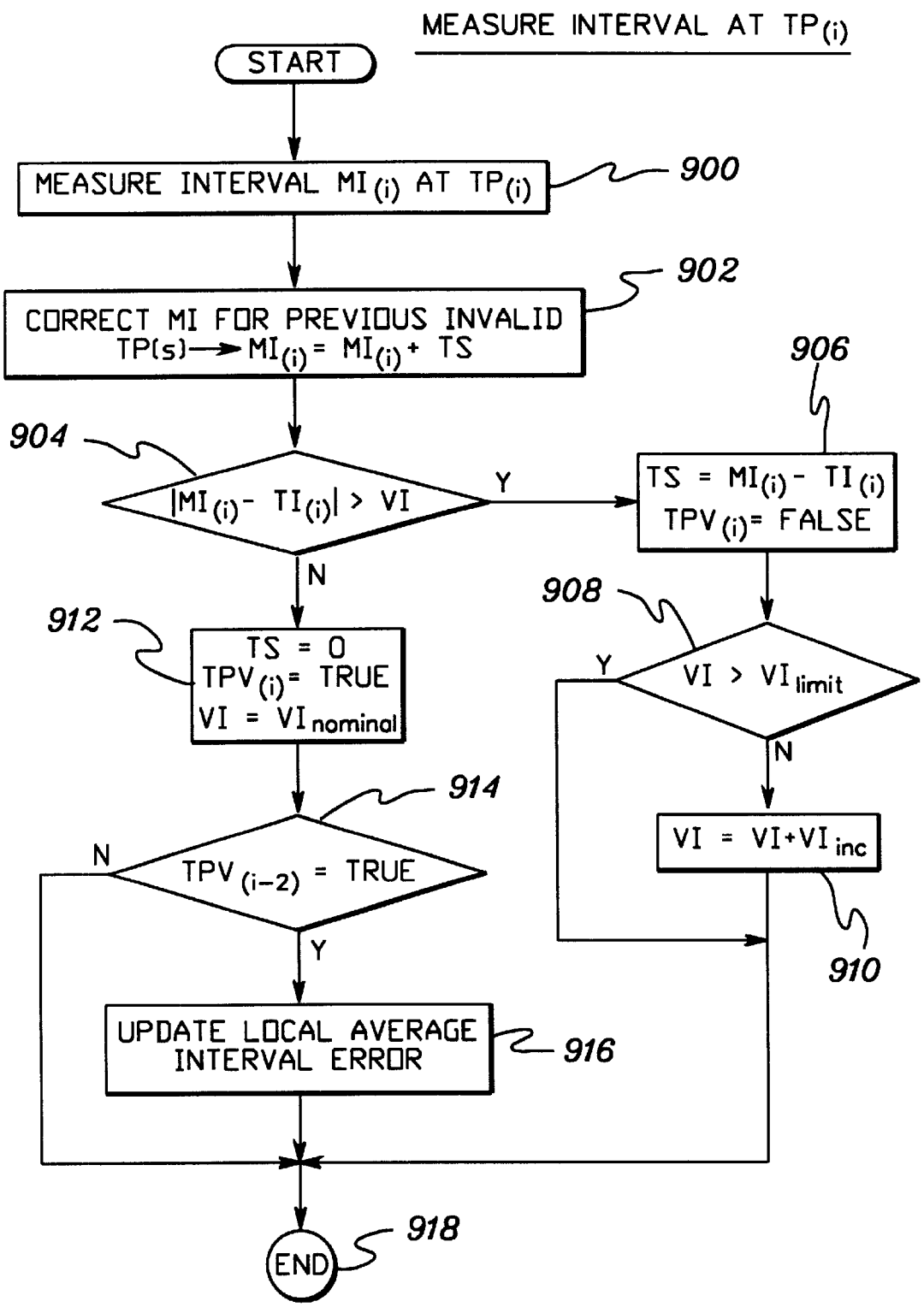
FIG. 9 depicts one embodiment of the logic used to measure intervals at $TP_i$, which are used during the timing propagation process of FIG. 7.

One embodiment of measuring intervals at trigger pattern one ($TP_{(1)}$) is described in detail with reference to FIG. 9. Initially, the interval at $TP_i$, where i is equal to 1 is measured using, for example, the time interval analyzer, STEP 900. (That is, the interval between $TP_{(0)}$ and $TP_{(1)}$ is measured.) Thereafter, the measured interval is corrected for previous invalid trigger patterns, STEP 902. This is accomplished by setting $MI_i$ equal to $MI_i$+TS (i.e., $MI_i$=$MI_{(i)}$+TS). Since the first trigger pattern is assumed to be valid, TS is set to zero and no correction is made.

Next, a determination is made as to whether the immediately corrected value of $MI_i$ minus the value of the target interval ($TI_{(i)}$) is greater than the valid interval window (VI), INQUIRY 904. If $|MI_i - TI_i|$ is greater than the valid interval window, then $MI_{(i)}$ is considered to be invalid. Thus, the value of time slip (TS) is set equal to $MI_i - TI_i$, and the trigger pattern valid flag ($TPV_{(i)}$) is set to FALSE, STEP 906. Thereafter, another inquiry is made as to whether the valid interval window is greater than a maximum value that has been set ($VI_{limit}$), INQUIRY 908. If the valid interval window is greater than the maximum (e.g., 700 nanoseconds), then the process for measuring the interval at the first trigger pattern is complete, STEP 918. However, if the valid interval window is less than or equal to the maximum, then the valid interval window is increased by a valid interval increment ($VI_{inc}$), STEP 910, and the measurement of $MI_i$ is complete. One example of a value for the valid interval increment is 35 nanoseconds.

Returning to INQUIRY 904, if the measured interval is valid, then the time slip is set equal to zero, the trigger pattern valid flag is set equal to TRUE and the valid interval window is set equal to the nominal value ($VI_{nominal}$), such as, for instance, 35 nanoseconds, STEP 912.

Subsequently, the trigger pattern valid flag for interval i−2 is checked to see if the trigger pattern at that location was valid, INQUIRY 914. If it was not valid, then again the measured interval process is complete and the local average interval error (LAIE) is left unchanged, STEP 918. However, if the trigger pattern at that location is valid, then the local average interval error (LAIE) (i.e., the velocity error) is updated, STEP 916.

In one example, the local average interval error is computed as follows:

$$LAIE=LAIE+q\times\{([MI_{(i)}+MI_{(i-1)}-TI_{(i)}-TI_{(i-1)}]\div 2)-LAIE\}$$

where q represents a value, which determines how fast the LAIE is going to track the difference between actual interval measurements and expected nominal velocity interval measurements, and is equal to a fraction such as 0.1.

Figure 8:
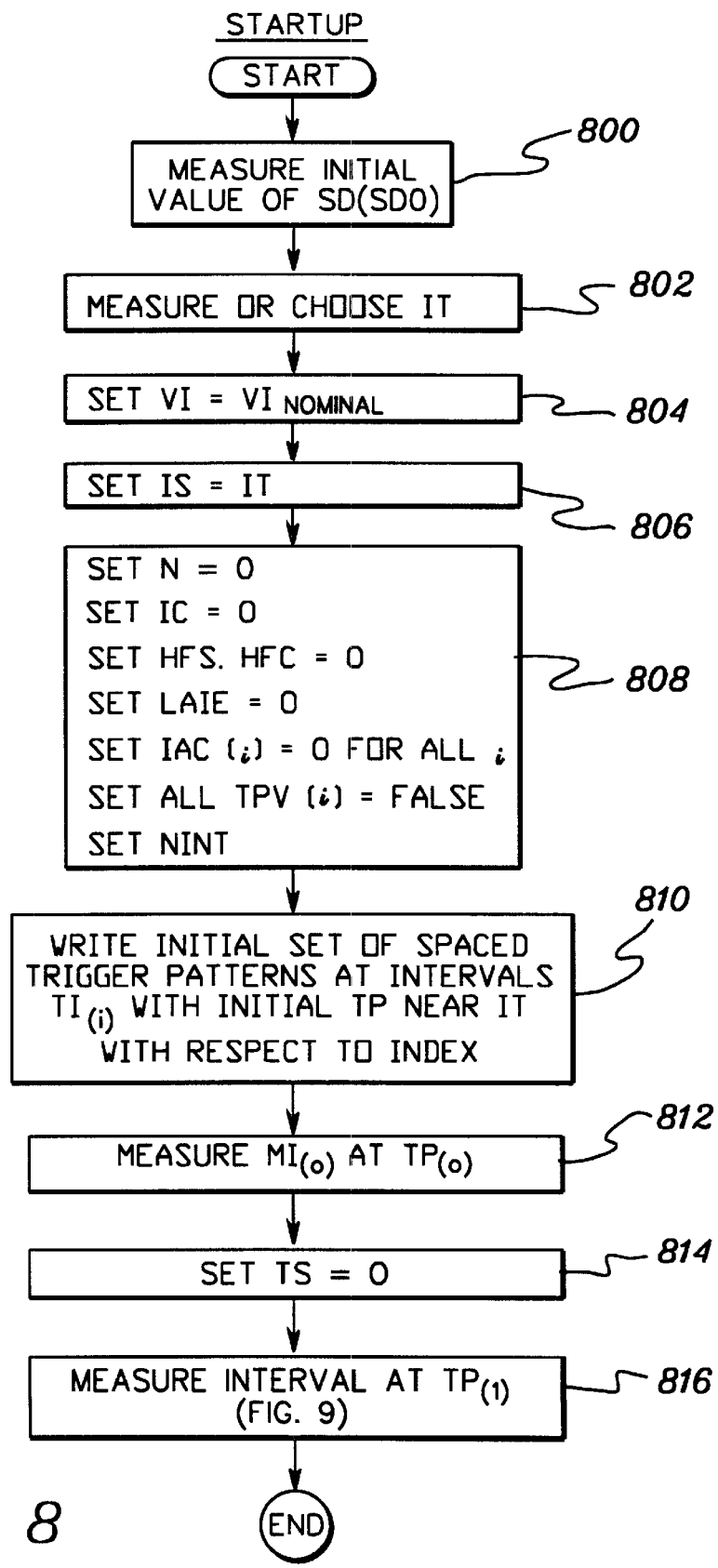
FIG. 8 depicts one embodiment of the start-up procedure shown in FIG. 7, used to initialize various variables to be used during the timing propagation process of FIG. 7.
Figure 10:
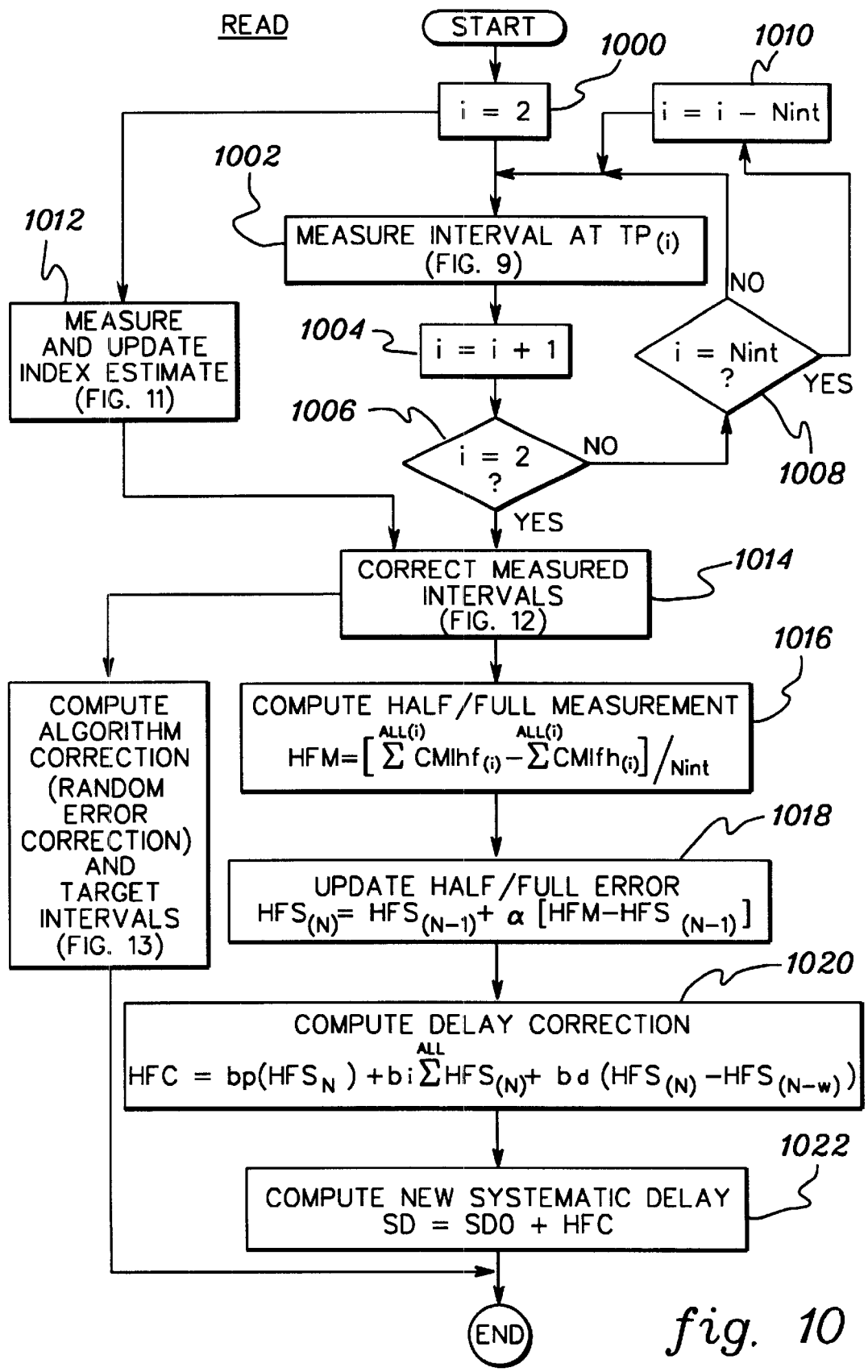
FIG. 10 depicts one embodiment of the read procedure referenced in FIG. 7.

Subsequent to updating the local average interval error, the process for measuring the interval at trigger pattern one is complete, as well as the start up procedure of FIG. 8. Therefore, processing proceeds with a read procedure, STEP 702 (FIG. 7). one embodiment of the read procedure is depicted in FIG. 10 and described in detail herein.

Initially, index i is set equal to 2, since the read is going to read back the interval starting with i=2 and go around past zero to one, STEP 1000. Thereafter, the interval at trigger pattern two is measured, STEP 1002, in the manner described above for measuring the interval at trigger pattern one (see FIG. 9). Subsequent to measuring the interval, the index is incremented by one, STEP 1004, and an inquiry is made to determine whether the process is complete, i.e., whether i has reached 2, again, INQUIRY 1006. If i is not equal to 2, then a further determination is made as to whether i is equal to a value of Nint, INQUIRY 1008. If i is not equal to Nint, then processing continues at STEP 1002 "Measure Interval At TP$_i$." If however, i is equal to Nint, then i is recalculated by subtracting Nint from i, (i.e., i=i−Nint), STEP 1010. Thereafter, processing continues with STEP 1002 "Measure Interval At TP$_i$."

In addition to the above, sometime after STEP 1010, an index estimate (IS) is measured and updated, STEP 1012. One embodiment for measuring and updating the index estimate is described in detail with reference to FIG. 11. Initially, the time interval between the index and the first available non-fake (i.e., valid or erroneous) trigger pattern after the index, which is usually either at TP$_0$ or TP$_1$, is measured using, for example, a time interval analyzer, STEP 1100. Further, a trigger pattern indice (TPind) is set equal to zero, STEP 1102. Subsequently, a determination is made as to whether the measurement (IM) of the interval between the index and the first available non-fake trigger pattern is greater than a target (IT) plus a variable IW (i.e., IM>IT+IW?), which reflects the allowed error from the target for the measurement to be considered valid, INQUIRY 1104. If IM is greater than this value, then the trigger pattern indice is incremented by one and IM is decremented by TI$_{(TPIND)}$, STEP 1106. Thereafter, processing returns to INQUIRY 1104, "IM>IT+IW?".

When IM is less than or equal to IT+IW, a check is made against the other end of the window. In particular, a determination is made as to whether IM is less than IT−IW, INQUIRY 1108. If IM is less than IT−IW, then the measurement is invalid and processing of the measurement and update of the index estimate (IS) is complete, STEP 1110.

However, if IM is not less than IT−IW, then the measurement may or may not be good. Thus, a determination is made as to whether the trigger pattern valid flag (TPV$_{TPIND}$) is equal to true, STEP 1112. If it is not equal to true, then the measurement is invalid and processing is complete, STEP 1110. However, if the flag is set equal to true, then it is a good measurement and an index estimate (IS) is updated as follows, STEP 1114:

$$IS=IS+f\times(IM-IS),$$

where f is a variable approximately equal to 0.1, which determines how fast IS is going to track IM. (In another embodiment, the above windowing of STEPS 1102–1112 are not used to determine if the measured time interval is valid. Other procedures may be used. The index estimate is updated when the measured time interval is valid.)

After measuring and updating the index estimate, processing continues with FIG. 10. Specifically, after the index estimate is measured and updated and/or after a positive result is received from INQUIRY 1006, the measured intervals (MI$_{(i)}$) are corrected, STEP 1014.

Figure 12:
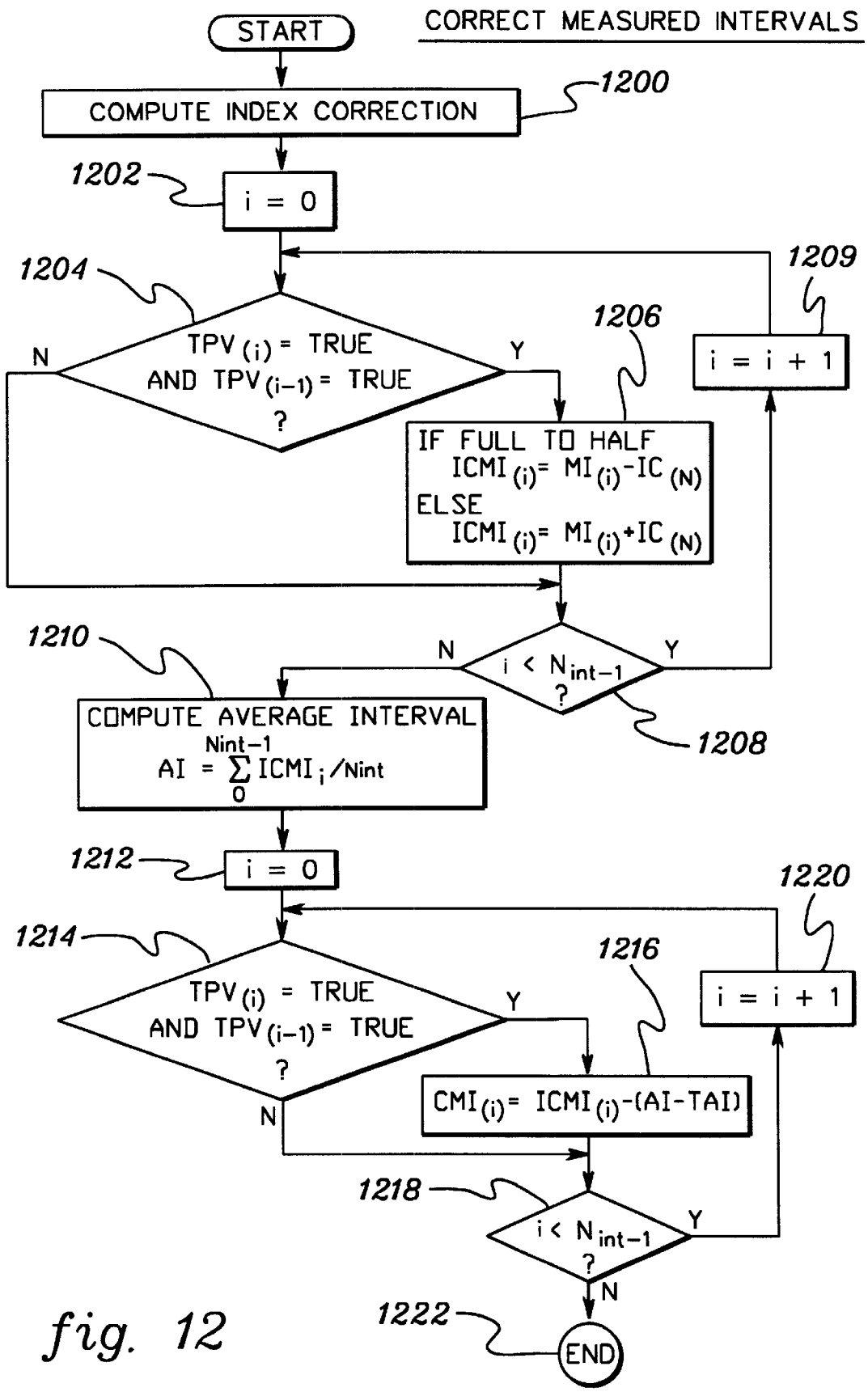
FIG. 12 depicts one embodiment of the logic used to correct measured intervals, which is used during the timing propagation process of FIG. 7.

One embodiment for correcting the measured intervals is described in detail with reference to FIG. 12. In one example, the operations described within FIG. 12 are performed by one or more processors (e.g., a processing unit) of timing propagation controller 218. In another embodiment, the processing unit need not be a part of the propagation controller.

Referring to FIG. 12, initially, an index correction is computed, STEP 1200, as follows:

$$IC_n = gp \times (IE_n) + gi \times \sum_0^n IE_n + gd[IE_n - IE_{n-Q}]$$

where:

IC is equal to the index correction, which is indicative, e.g., of the location of a trigger pattern on the disk relative to the rotational index of the disk;

gp is equal to a proportional gain which is approximately 0.4, in one embodiment;

gi is equal to an integral gain which is approximately equal to, for instance, 6×10$^{-5}$;

gd is equal to a differential gain, which is approximately equal to, for instance, 0.01;

Q is a variable which reflects how many steps occur between the measurements, which are going to be used to determine the slope, and is equal to, for instance, 10; and IE$_n$=IS−IT.

After computing the index correction, the index variable i is initialized to zero, STEP 1202. Thereafter, a determination is made as to whether the trigger pattern valid flag at index i (TPV$_i$) and the trigger pattern valid flag at i−1 (TPV$_{(i-1)}$) are equal to TRUE, INQUIRY 1204. If both of these flags are true and the measured interval is full to half (described below), then the index correction measured interval (ICMI) of i is computed, as follows:

$$ICMI_i=MI_i-IC_N.$$

However, if both of the flags are true and the measurement is half to full (described below), then the index correction measured interval is equal to the following:

$$ICMI_i=MI_i+IC_N.$$

A full to half interval corresponds to a time interval beginning with a full on-track trigger pattern and ending with an off-track trigger pattern. A half to full interval corresponds to a time interval beginning with an off-track trigger pattern and ending with an on-track trigger pattern. Each time interval includes a full to half interval and a half to full interval.

Subsequent to computing ICMI, or if at least one of the trigger pattern valid flags is false, then a determination is made as to whether i is less than $N_{int}-1$, INQUIRY 1208. When i is less than this value, then i is incremented by 1, STEP 1209, and processing continues for the next index with INQUIRY 1204. However, when i is greater than or equal to $N_{int-1}$, then an average interval is computed using the following equation, STEP 1210:

$$AI = \sum_{0}^{N_{int}-1} ICMI_i \div N_{int}.$$

Thereafter, i is set equal to zero again and another determination is made as to whether the trigger pattern valid flags at index i and at index i−1 are equal to true, INQUIRY 1214. When they are equal to true, then a corrected measured interval is computed as follows, STEP 1216:

$$CMI_i = ICMI_i - (AI - TAI).$$

After computing CMI or when at least one of the trigger pattern valid flags is invalid, a further determination is made as to whether i is less than $N_{int-1}$, STEP 1218. When i is less than this value, i is incremented by 1, STEP 1220, and processing continues for the next index at INQUIRY 1214. However, when i is greater than or equal to $N_{int-1}$, then the corrected measured interval processing is complete, STEP 1222.

Returning to FIG. 10 and in particular STEP 1014, subsequent to correcting the measured intervals, two paths are taken, each of which is described below. One of the paths includes, for instance, computing a half/full measurement, STEP 1016, as follows:

$$HFM = \left[ \sum^{all(i)} CMIhf_{(i)} - \sum^{all(i)} CMIfh_{(i)} \right] / N_{int},$$

wherein CMIhf is the subset of the CMIs, which are measured from half to full; and CMIfh is the subset of the CMIs, which are measured from full to half.

Subsequent to calculating HFM, a half to full error (HFS) is updated by using the following formula, STEP 1018:

$$HFS_N = HFS_{N-1} + \alpha \times [HFM - HFS_{N-1}]$$

where $\alpha$ is equal to, for instance, 0.025.

Thereafter, a delay correction is computed as follows, STEP 1020:

$$HFC = bp(HFS_{(N)}) + bi \sum^{all} HFS_{(S)} + bd(HFS_{(N)} - HFS_{(N-W)}),$$

where w is equal to, for instance, 10.

Subsequently, a new systematic delay (SD) is computed by adding the delay correction to the initial value of the systematic delay (i.e., SD=SD0+HFC), STEP 1022. The new systematic delay adjusts where the trigger patterns on the next step are to be written. This ends the first path.

Figure 13:
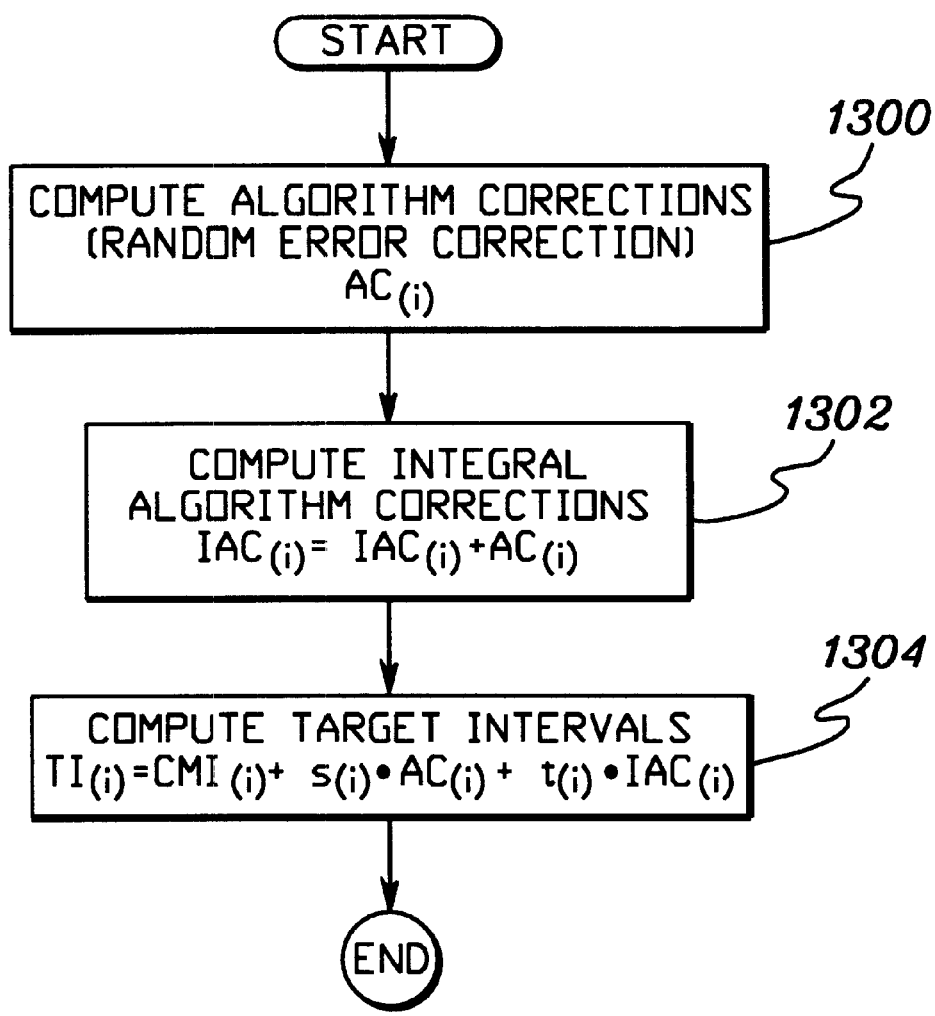
FIG. 13 depicts one embodiment of the logic used to compute algorithm corrections and target intervals, which is used during the timing propagation process of FIG. 7.
Figure 14:
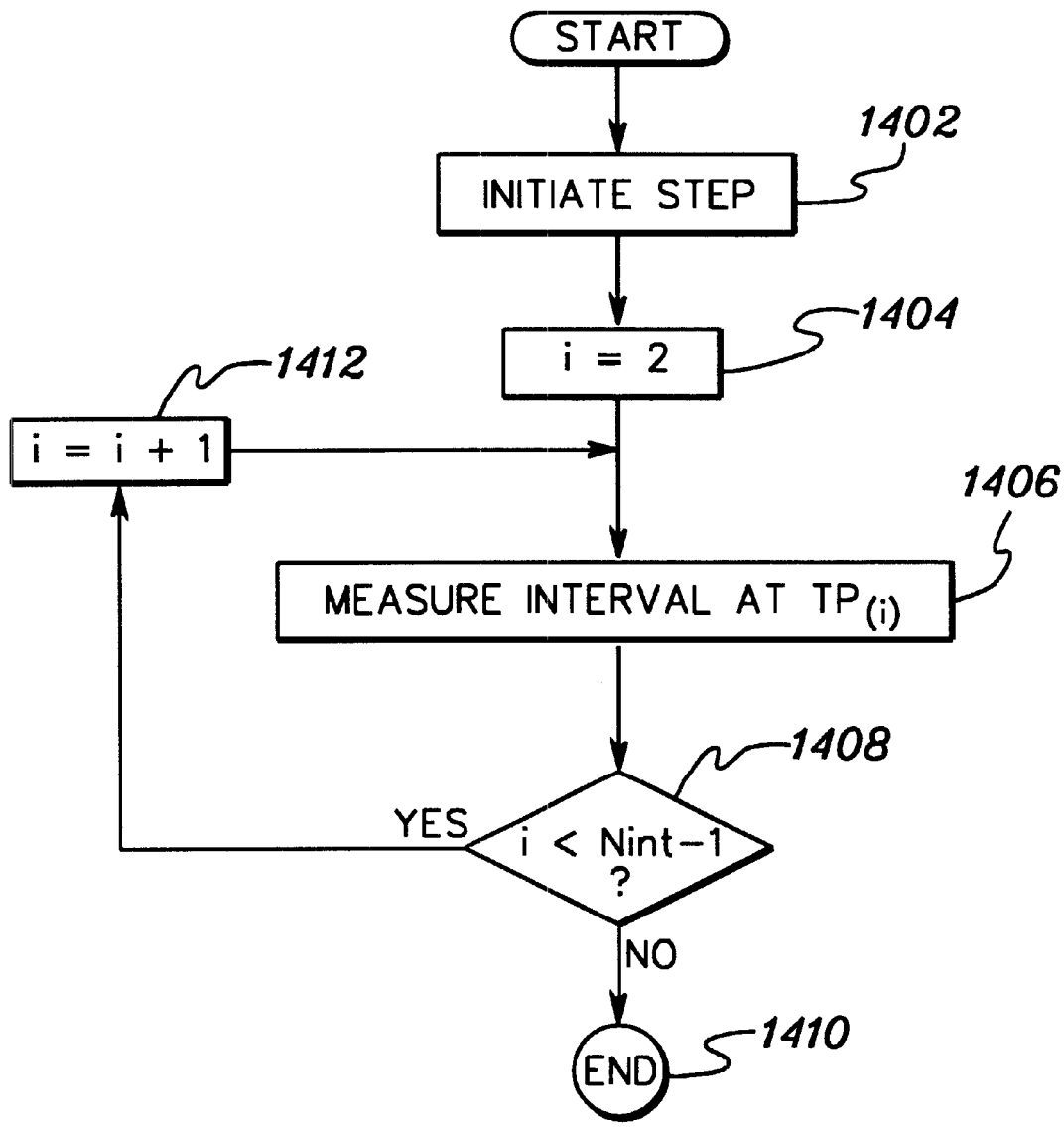
FIG. 14 depicts one embodiment of the logic used in the step procedure referenced in FIG. 7.
Figure 15:
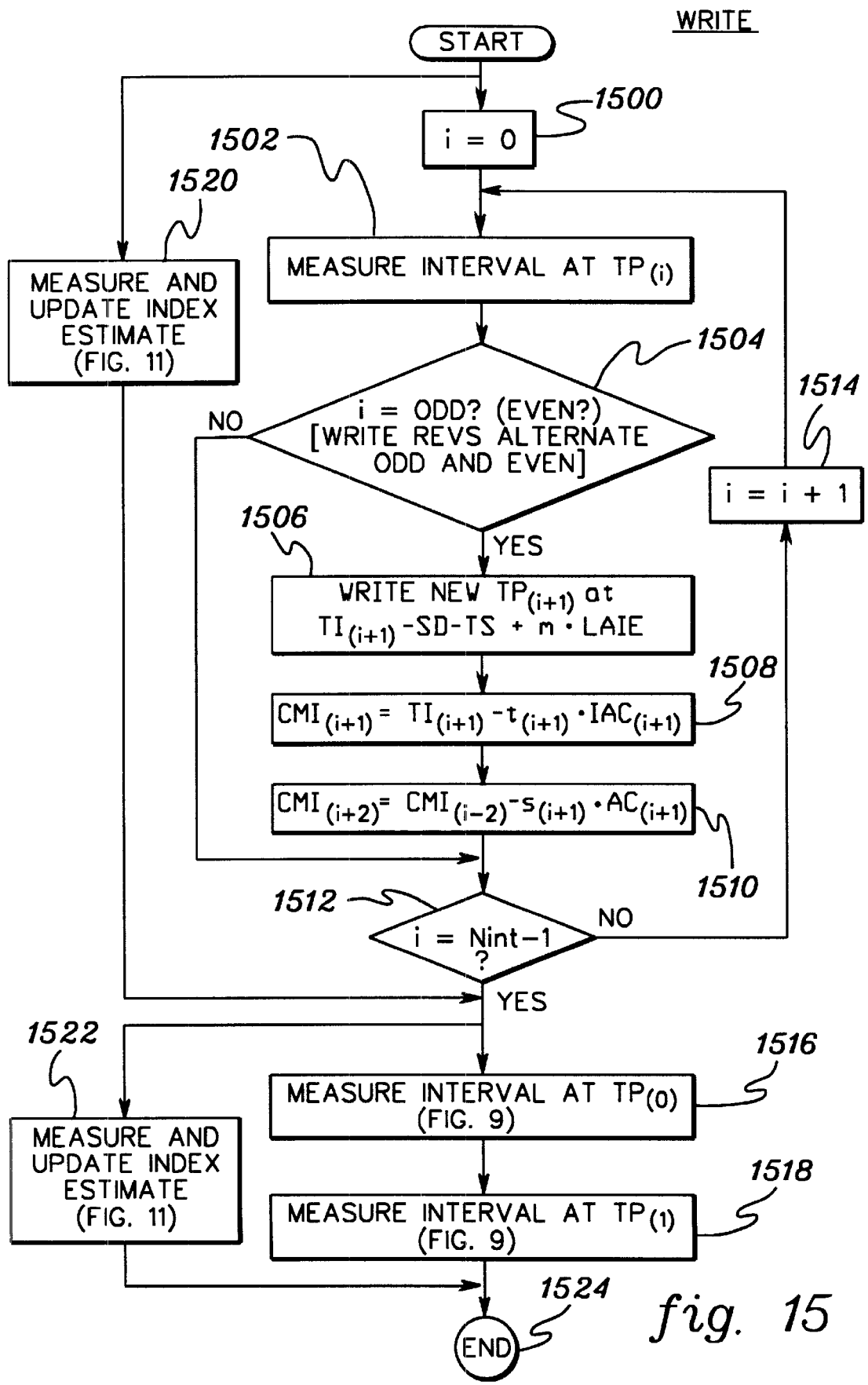
FIG. 15 depicts one embodiment of the logic used during the write procedure of FIG. 7.

The second path taken after correcting the measured intervals includes computing an algorithm correction (i.e., random error correction) and target intervals, which are described in detail with reference to FIG. 13.

In one embodiment, initially an algorithm correction ($AC_i$) is computed, STEP 1300. In one example, $AC_i$=(TAI−$CMI_i$) x a fraction, such as 0.3. (Algorithm correction is also described in commonly assigned U.S. Pat. No. 5,485,322, issued on Jan. 16, 1996, entitled "Method And System For Writing A Clock Track On A Storage Medium," which is hereby incorporated herein by reference in its entirety.)

Thereafter, an integral algorithm correction used in correcting circumferential systematic errors is computed using the following formula, STEP 1302:

$$IAC_i = IAC_i + AC_i.$$

Additionally, target intervals are computed, as follows, STEP 1304:

$$TI_i = CMI_i + s_i \times AC_i + t_i \times IAC_i,$$

where:

$s_i$ are typically equal to 1; and $t_i$ are typically equal to 0.

Once these computations are made, processing of the compute algorithm corrections and target intervals, as well as processing of the read procedure is complete (see FIG. 10) and processing continues with STEP 704 of FIG. 7.

In particular, a step procedure is performed in order to move to the next servo-track. One embodiment of the step procedure is described with reference to FIG. 14. Initially, a command to move the actuator to the next servo-track is sent to the system that moves the actuator (e.g., a radial propagation controller or a pusher), STEP 1402. Then, an index value, i, is set equal to 2, STEP 1404. Thereafter, a measurement is taken at trigger pattern i, STEP 1406. In particular, the interval at $TP_i$ is measured as described above with reference to FIG. 9.

Subsequent to measuring the interval, a determination is made as to whether i is less than Nint−1, INQUIRY 1408. If i is greater than or equal to Nint−1, then processing of the step procedure is complete, STEP 1410. However, if i is less than Nint−1, then i is incremented by 1, STEP 1412, and processing continues with measure interval at $TP_i$, STEP 1406.

Returning back to FIG. 7, in addition to the step procedure, a procedure to write trigger patterns on the next track (or the next radial position) is performed, STEP 706. One embodiment of the write procedure is described in detail with reference to FIG. 15.

Initially, i is set equal to zero, STEP 1500, and then, the interval at $TP_i$ is measured, as described above, STEP 1502. Thereafter, a determination is made as to whether the index value is equal to odd or even, STEP 1504. This will depend on whether the write revolution is triggering on odds and writing on evens, or vice versa. If the revolution is triggering on odds and i is equal to odd (or if the revolution is triggering on evens and i is equal to even), then a new trigger pattern is written with a delay of $TI_{i1}$−SD−TS+m×LAIE, where m is equal to approximately 1.0, in one example, STEP 1506.

Next, a corrected measured interval for i+1 is updated as follows, STEP 1508:

$$CMI_{i+1} = TI_{i+1} - (t_{i+1} \times IAC_{i+1}).$$

Additionally, $CMI_{i+2}$ is updated as follows, STEP 1510:

$$CMI_{i+2} = CMI_{i-2} - (s_{i+1} \times AC_{i+1}).$$

Thereafter, or if i is not equal to odd (or to even), then a determination is made as to whether i is equal to Nint−1, INQUIRY 1512. If i is not equal to Nint−1, then i is incremented by one at STEP 1514 and processing continues with STEP 1502 "MEASURE INTERVAL AT $TP_i$." However, if i is equal to Nint−1, the n the interval is measured at $TP_0$ and $TP_1$, STEPS 1516 and 1518.

Figure 11:
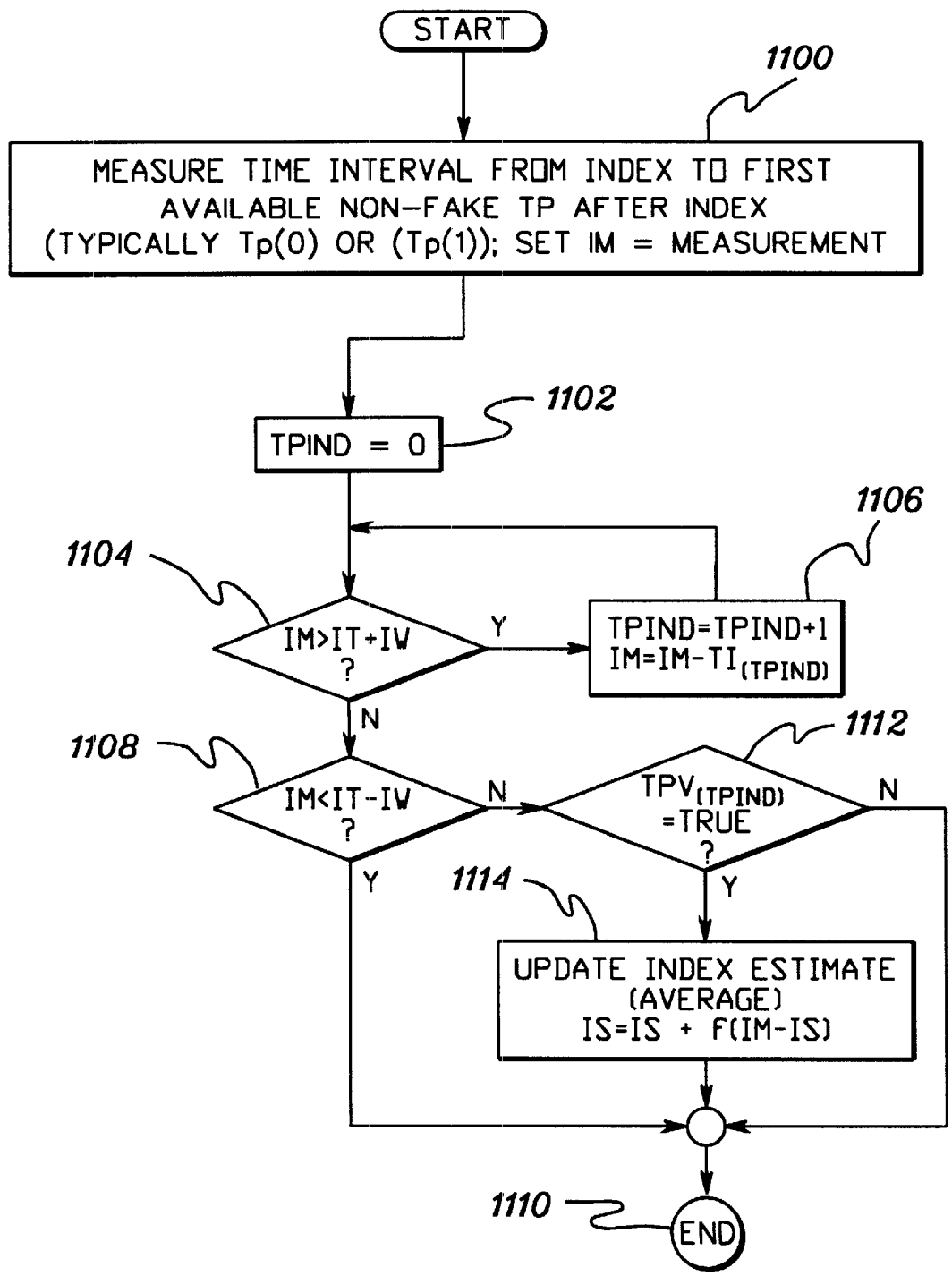
FIG. 11 depicts one embodiment of the logic used to measure and update an index estimate, which is used during the timing propagation process of FIG. 7.

In addition to the above, sometime between STEPS 1500 and 1516, the index estimate is measured and updated, as described with reference to FIG. 11, STEP 1520. Thereafter, processing continues with STEP 1516. Further, sometime after STEP 1516 and before STEP 710 of FIG. 7, the index estimate is measured and updated again, STEP 1522.

Returning to FIG. 7, after the write processing is complete, then the step number is incremented by 1, STEP 708, and a determination is made as to whether trigger patterns are to be written at other radial positions, INQUIRY 710. If so, then flow returns to STEP 702 "READ."

By using the above technique, a related set of trigger patterns is produced, which has some systematic oscillation at a period of two times the step size (A). Thus, if the step size is one-quarter track (i.e., A=¼), then the periodicity is at one-half (i.e., 2×¼=½). Therefore, if the related set of trigger patterns is sampled at points 2×A apart, there is nominally (on average) zero time shift between the points.

The logic within the FIGS. 7–15 is performed by one or more controllers (e.g., a controlling unit), such as timing propagation controller 218 (FIG. 2c). For example, many of the calculations and comparisons are performed by one or more processors (e.g., a processing unit) of the controller. Further, the time measurements are performed by, for example, a measuring unit, such as, for instance, the time interval analyzer or the motor index in combination with the counter within the processor, as described above. Additionally, the programmable delay is used, as one example, to shift location of patterns.

In another embodiment, many of the calculations and comparisons are performed by one or more computing units, which may or may not be a part of controller 218 or any controlling unit. In one instance, a computing unit is a processor. In further embodiments, other components may be used to perform the above-described functions and these components may or may not be a part of controller 218 or any controlling unit. For instance, the measuring unit used to measure time intervals may or may not be a part of controller 218 or any controlling unit. As a further example, a processing unit (e.g., one or more processors) that is not considered a part of the controller or controlling unit may be used to perform at least a portion of the logic within controller 218.

Another embodiment of determining an off-track time shift estimate is described in detail with reference to FIG. 16. In this embodiment, time intervals are measured from the motor index (which is a once per revolution index) to the same trigger pattern, at two different radial locations.

Figure 16:
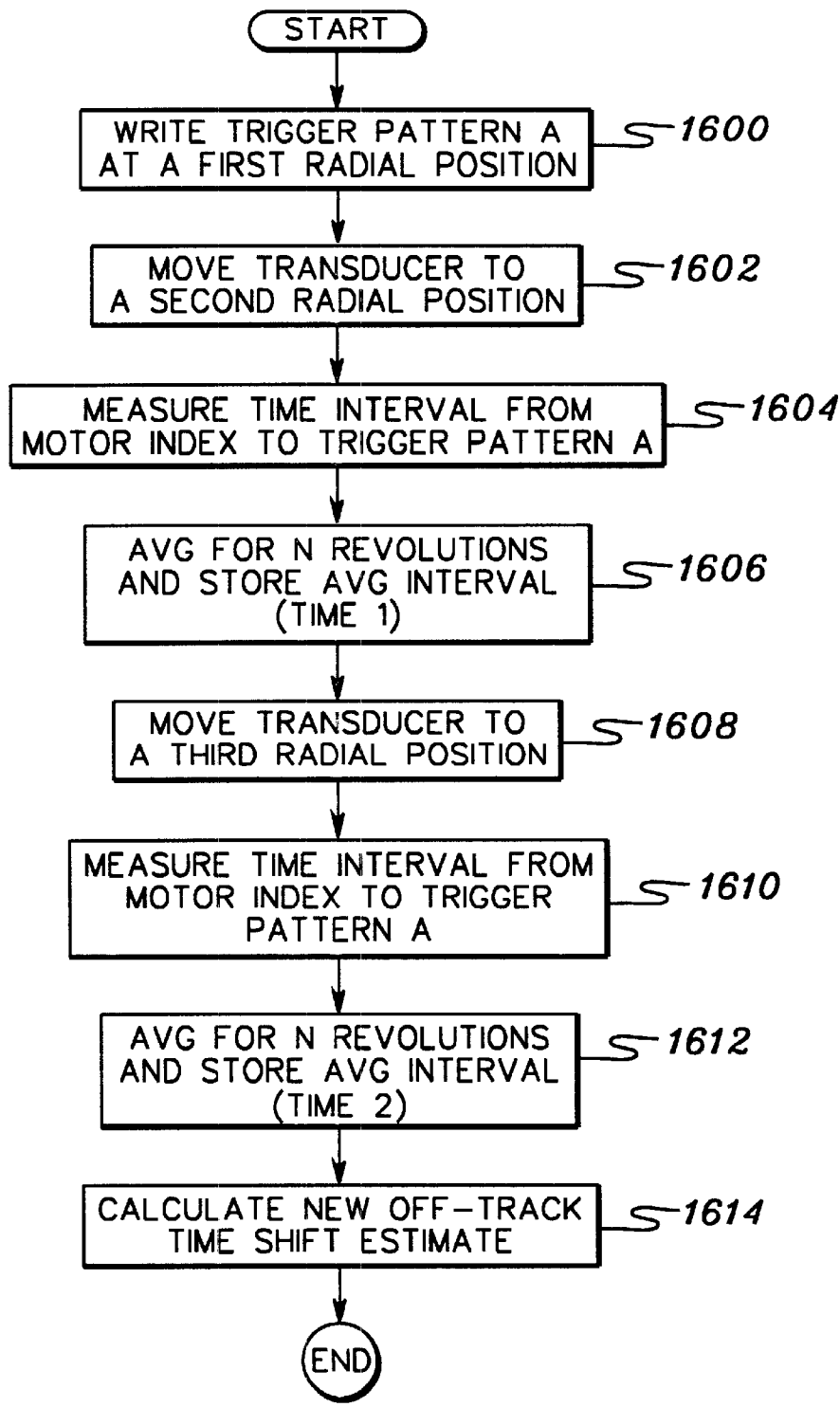
FIG. 16 depicts another embodiment of the logic used to determine an off-track time shift estimate, in accordance with the principles of the present invention.

Referring to FIG. 16, initially, pattern generator 220 is used to write a trigger pattern (TP A) at a chosen radial position, referred to herein as a first radial position, STEP 1600. Thereafter, the transducer may be moved to a second radial position, STEP 1602. As described above with reference to FIG. 6, the second radial position may or may not be equal to the first radial position.

At the second radial position, a measurement is taken of the time interval from the motor index to trigger pattern A using, for instance, time interval analyzer 262 of timing propagation controller 218 (FIG. 2c), STEP 1604. In a further embodiment, at least one measurement is taken on a plurality of revolutions of the storage medium. Thus, one or more measurements can be taken on N revolutions of the storage medium, where N is equal to one or more.

Subsequently, an average of the measurements taken on the N revolutions is computed and the value is stored in a variable referred to as TIME 1, STEP 1606.

Thereafter, the transducer is moved to a third radial position via actuator 208, STEP 1608. The third radial position is different from the second radial position, but it is still a position from which trigger pattern A can be read. Further, the third radial position may be at a new desired track pitch (e.g., one-half, instead of one-quarter). At this position, another measurement is taken of the time interval from the motor index to trigger pattern A, STEP 1610. As with the first measurement, one or more measurements may be taken on one or more revolutions of the storage medium.

After taking the measurements for N revolutions, in which N may be equal to one or more, an average of the measurements is computed and stored in a variable referred to as TIME 2, STEP 1612.

Next, TIME 1 and TIME 2 are used to compute the new off-track time shift estimate, STEP 1614. In one example, the off-track time shift estimate is calculated by subtracting TIME 2 from TIME 1.

Figure 17:
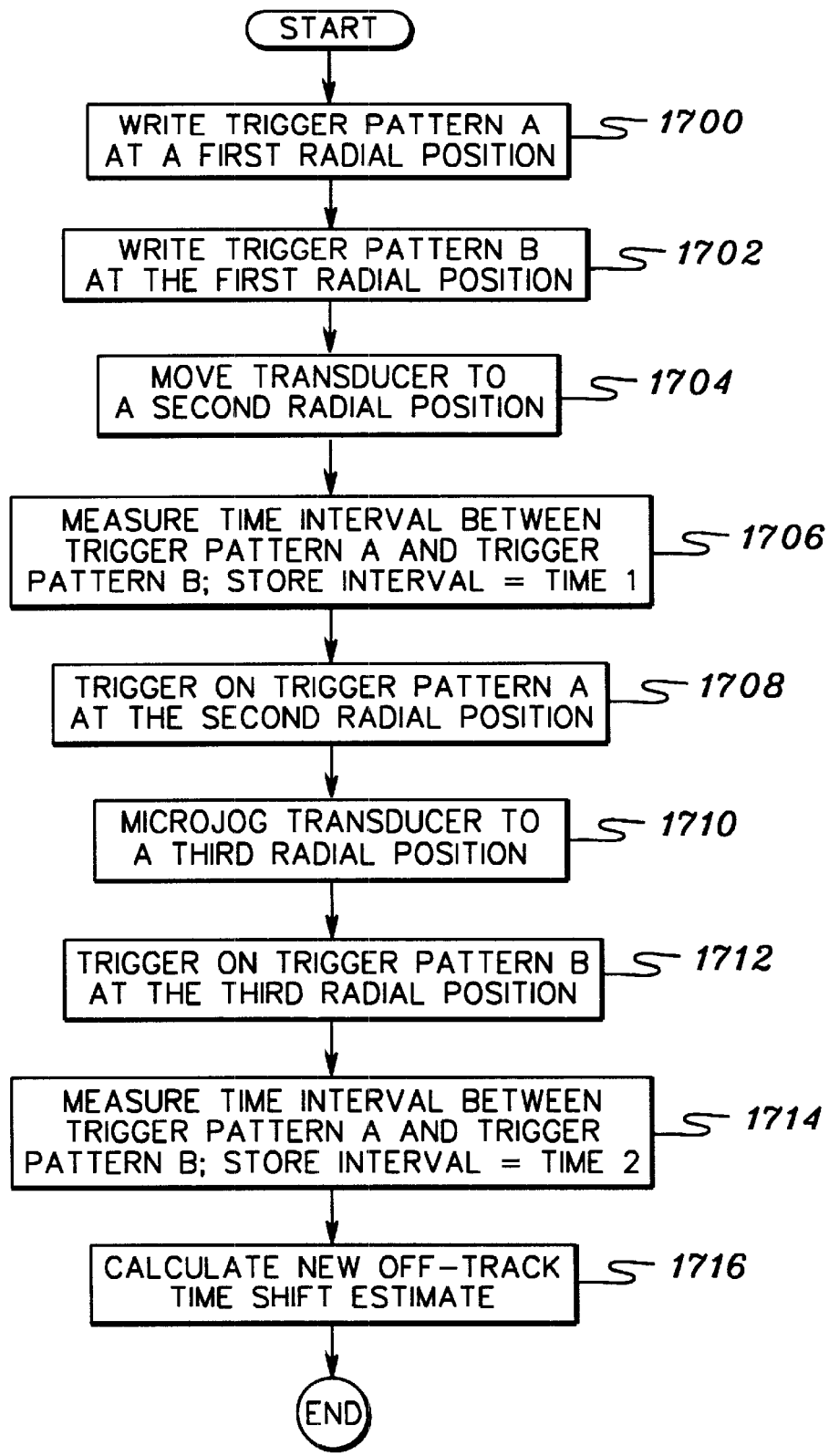
FIG. 17 depicts a further embodiment of the logic used to determine an off-track time shift estimate, in accordance with the principles of the present invention.

Another embodiment for determining an off-track time shift estimate is described with reference to FIG. 17. In this embodiment, a microjog (quick physical move) of the transducer occurs during a time interval between two written trigger patterns, as described below.

Initially, a trigger pattern, referred to as trigger pattern A, is written at a first radial position using pattern generator 220, STEP 1700. Thereafter, a second trigger pattern, trigger pattern B, is written at the same radial position, but displaced in time (i.e, at a different circumferential location of the storage medium), STEP 1702.

The transducer is then moved to a second radial position, if desired, STEP 1704. As described above with reference to FIG. 6, this second radial position may or may not be the same as the first radial position, and it may or may not be necessary to move the transducer. If the transducer is already at the second radial position, then it need not be moved.

At the second radial position, the time interval between the first trigger pattern and the second trigger pattern is measured and stored in a variable referred to as TIME 1, STEP 1706.

Subsequent to taking the measurement, but still at the second radial position, the transducer triggers on trigger pattern A, STEP 1708, and microjogs (physically moves) to a third radial position, STEP 1710. The third radial position is different from the second radial position, but the ability to read both the trigger patterns is still available. In one example, the transducer microjogs a ½ track width.

While triggering on trigger pattern B at the third radial position, STEP 1712, the time interval between the first and second trigger patterns is measured using time interval analyzer 262, and the value is stored as TIME 2, STEP 1714.

Thereafter, the new off-track time shift estimate is calculated, STEP 1716. In one example, the off-track time shift estimate is equal to TIME 1−TIME 2.

Figure 18:
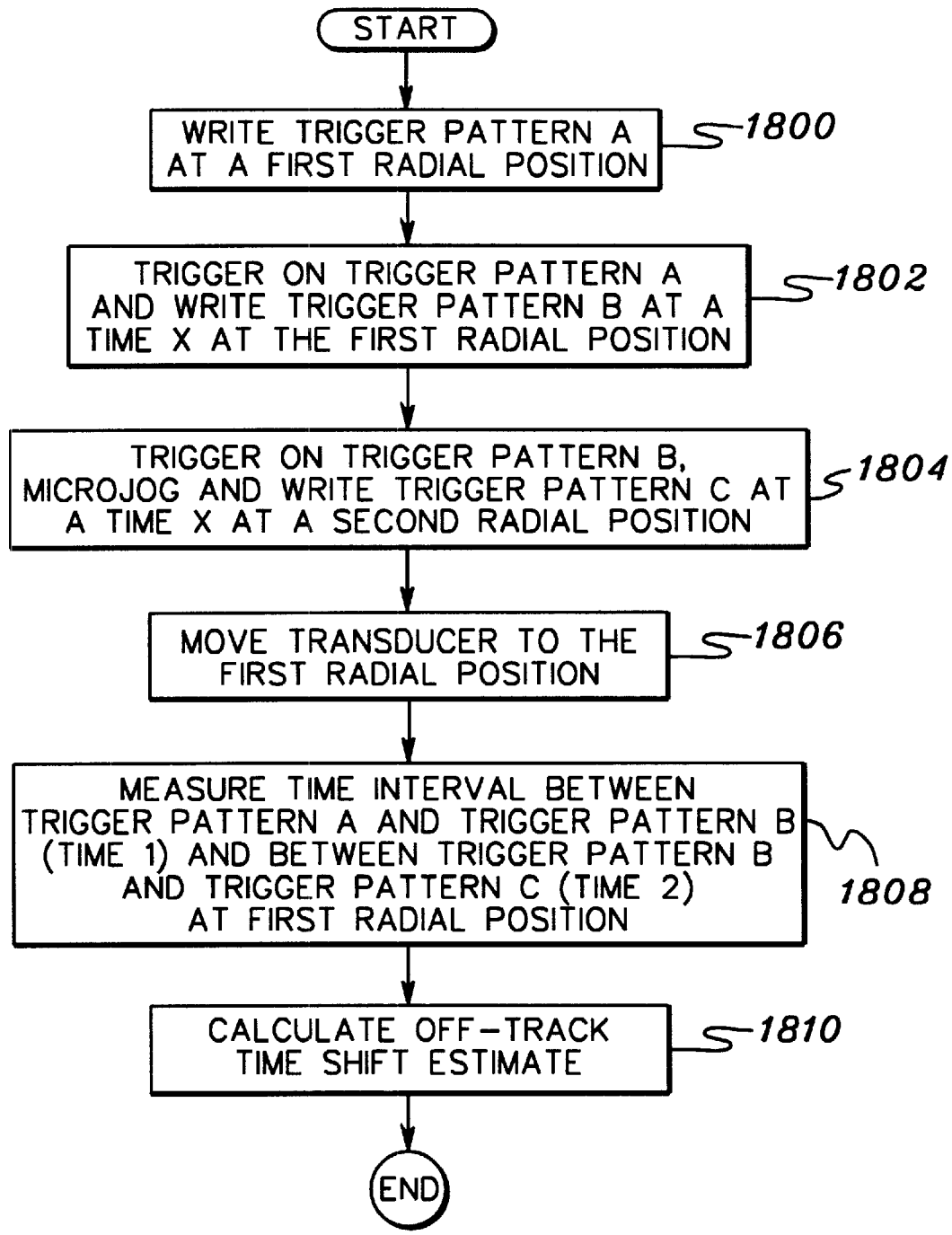
FIG. 18 depicts another embodiment of the logic used to determine an off-track time shift estimate, in accordance with the principles of the present invention.

Another embodiment for determining an off-track time shift estimate is described in detail with reference to FIG. 18. In this embodiment, a microjog occurs prior to writing a trigger pattern, as described below.

Initially, a first trigger pattern, trigger pattern A, is written at a chosen radial position, referred to as a first radial position, STEP 1800. At that same radial position, but displaced in time by a known time, Time X, another trigger pattern, trigger pattern B, is written by triggering on trigger pattern A, STEP 1802.

While triggering on trigger pattern B, a microjog (e.g., ½ track width) of the transducer occurs, and trigger pattern C is written at a second radial position displaced in time by the same Time X, STEP 1804. Thereafter, the transducer is moved to the first radial position, STEP 1806.

At the first radial position, the time interval between trigger pattern A and trigger pattern B is measured and stored as TIME 1, and the time interval between trigger pattern B and trigger pattern C is measured and stored as TIME 2, STEP 1808.

Thereafter, the off-track time shift estimate is calculated, STEP 1810. In one example, the estimate is calculated by subtracting TIME 2 from TIME 1.

Figure 19:
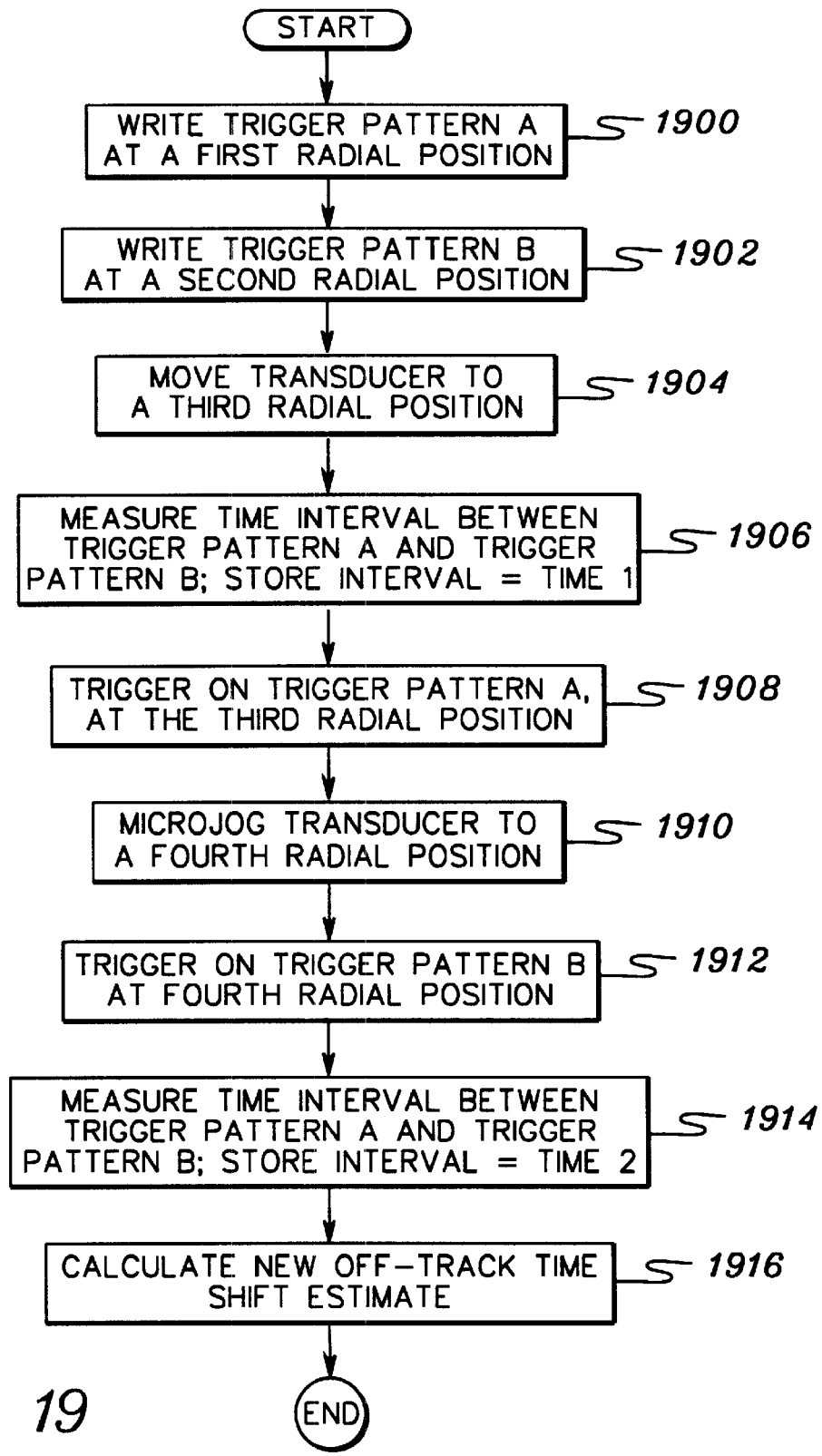
FIG. 19 depicts yet another embodiment of the logic used to determine an off-track time shift estimate, in accordance with the principles of the present invention.

Another embodiment of determining an off-track time shift estimate is described with reference to FIG. 19. In this embodiment, a microjog of the transducer occurs during a time interval between two written trigger patterns, as described below.

Initially, a trigger pattern, referred to as trigger pattern A, is written at a first radial position using pattern generator 220, STEP 1900. Thereafter, the transducer is moved to a second radial position and a second trigger pattern, trigger pattern B, is written at that second radial position, STEP 1902. In this embodiment, the second radial position is different from the first radial position, and it is at a new track pitch (e.g., move ½ track width). However, it is still possible to read trigger pattern A from the second radial position. The transducer is then moved to a third radial position, if desired, STEP 1904. Similar to the situation described above with reference to FIG. 6, the third radial position may or may not be the same as the first radial position, and it may or may not be necessary to move the transducer. If the transducer is already at the third radial position, then it need not be moved.

At the third radial position, the time interval between the first trigger pattern and the second trigger pattern is measured and stored in a variable referred to as TIME 1, STEP 1906. Further, at the third radial position, the transducer triggers on trigger pattern A, STEP 1908, and microjogs (physically moves) to a fourth radial position, STEP 1910. In one example, the fourth radial position is equal to the second radial position.

While triggering on trigger pattern B at the fourth radial position, STEP 1912, the time interval between the first and second trigger patterns is measured using time interval analyzer 262, and the value is stored as TIME 2, STEP 1914.

Thereafter, the new off-track time shift estimate is calculated, STEP 1916. In one example, the off-track time shift estimate is equal to TIME 1–TIME 2.

Figure 20:
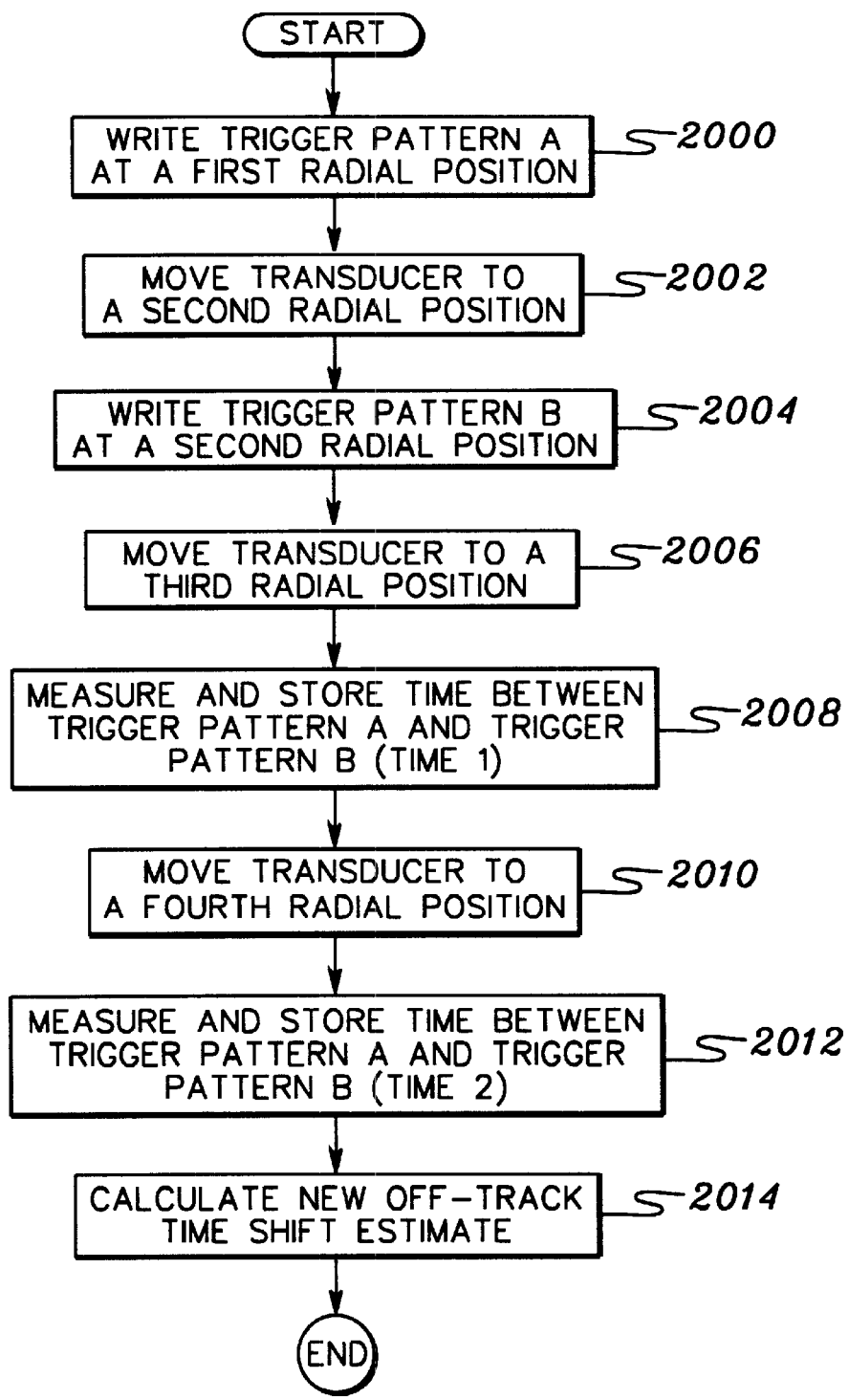
FIG. 20 depicts one embodiment of the logic used to determine a partial off-track time shift estimate, in accordance with the principles of the present invention.

In another embodiment of the invention, a partial off-track time shift estimate is determined. In this embodiment, effects due to non-parallelism or misaligned head mounts are not detected but second order effects, such as hooked or distorted transitions, are detected. This embodiment is described in detail with reference to FIG. 20. In this embodiment, time intervals are measured, at two different radial positions, between two trigger patterns written at different radial positions. This provides a measurement of the difference in the center location of two trigger patterns written at different radial positions.

Initially, pattern generator 220 is used to write a trigger pattern (TP A) at a chosen radial position, which is referred to herein as a first radial position, STEP 2000. Thereafter, actuator 208 is used to move the transducer to another radial position, which is referred to herein as the second radial position, STEP 2002. The second radial position is different from the first radial position; however, the second radial position is a position in which the transducer is still able to read trigger pattern A.

At the second radial position, a second trigger pattern (TP B) is written via pattern generator 220, STEP 2004. Subsequently, the transducer is moved to a third radial position, if desired, STEP 2006. That is, if the third radial position is not equal to the second radial position and/or if the transducer is not located at the third radial position, the transducer is moved to the third radial position.

At the third radial position, the time between trigger pattern A and trigger pattern B is measured using time interval analyzer 262, and the value is stored in a variable referred to as TIME 1, STEP 2008.

Thereafter, the transducer is moved to a fourth radial position, STEP 2010. The fourth radial position is different from the third radial position. However, the fourth radial position is chosen such that both written trigger patterns can still be read. In one example, the fourth radial position is again advanced ¼ step.

At the fourth radial position, a measurement of the time between trigger pattern A and trigger pattern B is once again taken, STEP 2012. This time it is stored in a variable referred to as TIME 2.

The values of TIME 1 and TIME 2 are then used to determine a new partial off-track time shift estimate, STEP 2014. In particular, in this embodiment, TIME 1 and TIME 2 are first used to determine the change in the off-track time shift estimate (i.e., delta). This is because the off-track position is already known at one location, and thus, the change is computed in order to get to the second position. The change is then used to determine the new partial off-track time shift estimate. In particular, the partial estimate of the shift at the new track pitch is equal to the estimate of the shift at the first track pitch plus a delta, which is TIME 2 minus TIME 1. (The estimate of the shift at the first track pitch is equal to the integral term, $$gi \times \sum_{0}^{n} IE_n,$$

of the index correction equation of FIG. 12.)

Described in detail above are various techniques for determining an off-track time shift estimate and one technique for determining a partial off-track time shift estimate. In each of the above embodiments, a plurality of measurements may be taken and averaged to obtain TIME 1 and TIME 2.

The off-track time shift estimate, determined in accordance with the principles of the present invention, is a correction value used in writing subsequent trigger patterns. In one example, the measured off-track time shift estimate is used in the index correction equation (see FIG. 12 and accompanying text) to determine the index correction. Specifically the integral term, $$gi \times \sum_{0}^{n} IE_n,$$

is replaced by the value of the off-track time shift estimate, and the proportional gain and differential gain terms are set equal to zero.

Advantageously, the off-track time shift estimate reduces trigger pattern slew when writing subsequent trigger patterns on the storage media. In particular, the off-track time shift estimate reduces pattern slew when writing trigger patterns at a different propagation pitch than was previously being used.

Figure 21A:
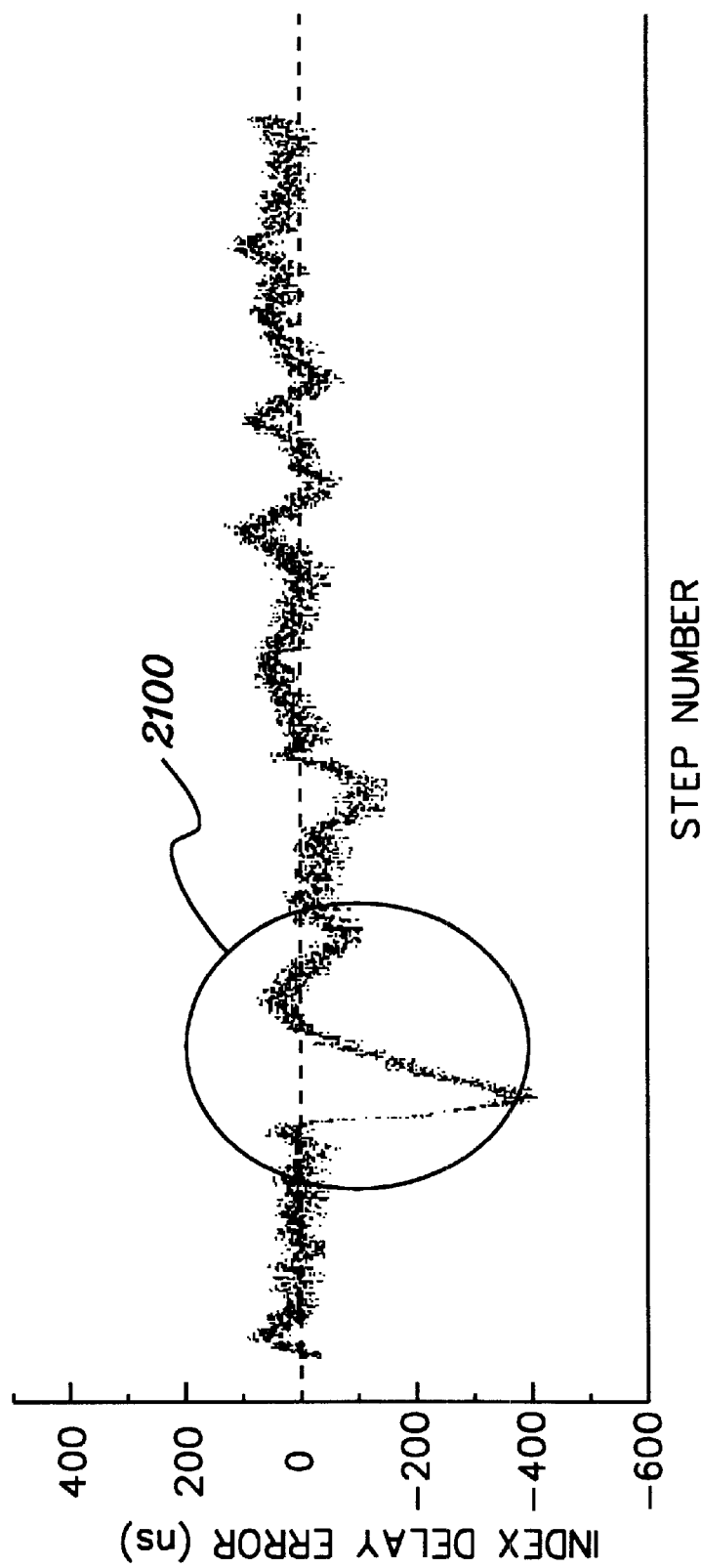
FIG. 21a illustrates pattern slew that occurs when an off-track time shift estimate is not used to write subsequent trigger patterns at a different track pitch.
Figure 21B:
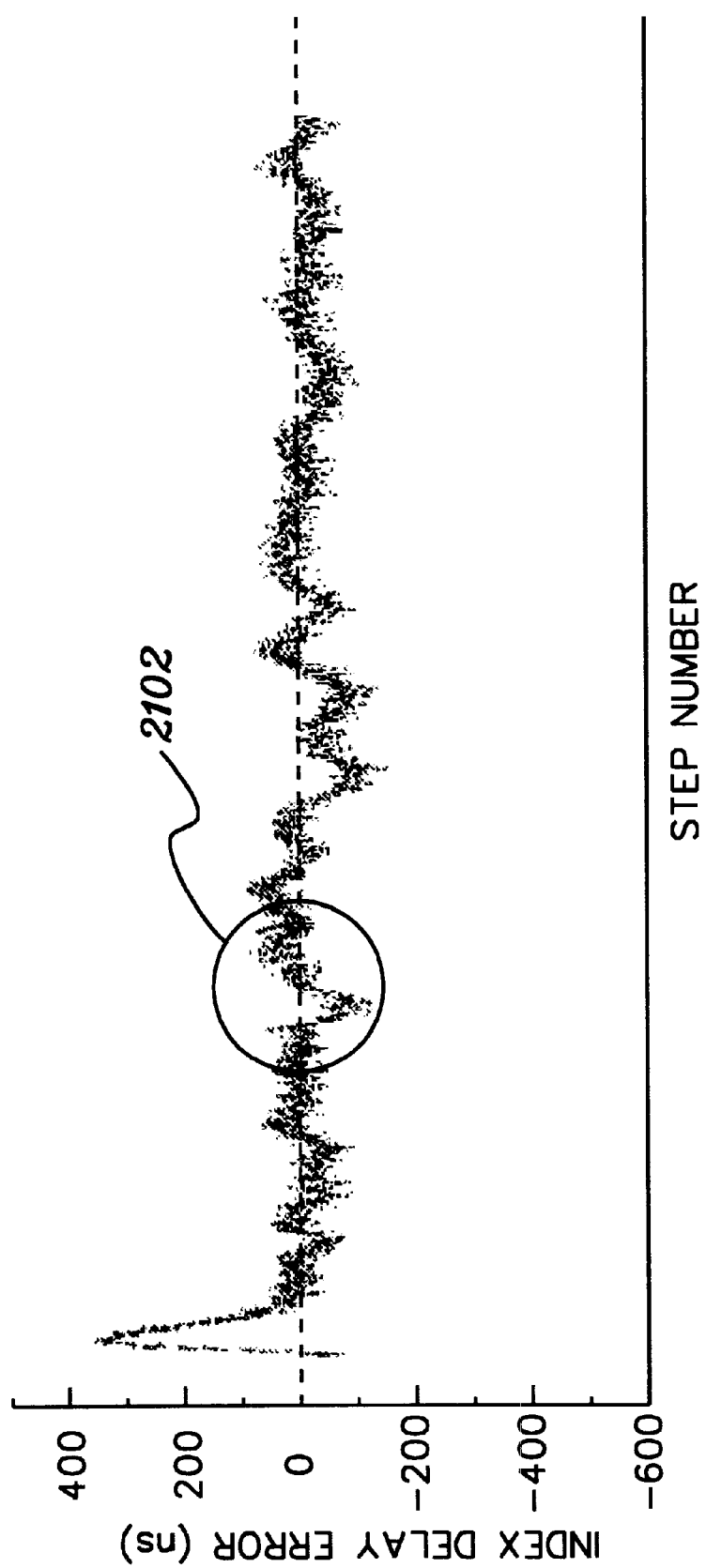
FIG. 21b illustrates how the use of an off-track time shift estimate reduces pattern slew when writing subsequent trigger patterns at a different track pitch.

FIG. 21a depicts a pattern that was written without taking into consideration the off-track time shift estimate of the present invention, and FIG. 21b depicts a pattern that was written with the off-track time shift estimate. As shown in FIG. 21a, pattern slew 2100 is much greater than pattern slew 2102 of FIG. 21b. Thus, the off-track time shift estimate of the present invention allows switch-over from one propagation pitch to another while reducing pattern slew. By enabling the use of a larger track pitch, processing time is greatly reduced (by an average of 30%), thereby decreasing the capital cost of servowriters. (Although switching from one track pitch to another track pitch is described herein, the present invention is equally applicable to determining an off-track estimate when the track pitch is the same.)

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just exemplary. There may be many variations to these diagrams or the steps (or operations) described therein without departing from the spirit of the invention. For instance, the steps may be performed in a differing order, or steps may be added, deleted or modified. All of these variations are considered a part of the claimed invention.

The use of the terms first, second, third, etc. in the claims does not necessarily correspond to the use of those terms in the flow diagrams or throughout the text. Further, the use of those terms does not designate any time or placement order.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of determining off-track time shift estimates, said method comprising:
   measuring, at one radial position, a first time interval between a selected criterion and a trigger pattern written on a storage medium;
   measuring, at another radial position, a second time interval between said selected criterion and said trigger pattern; and
   determining an off-track time shift estimate using said first time interval and said second time interval.

2. The method of claim 1, wherein said determining comprises subtracting said second time interval from said first time interval to obtain said off-track time shift estimate.

3. The method of claim 1, further comprising using said off-track time shift estimate to write subsequent trigger patterns on said storage medium.

4. The method of claim 1, further comprising writing, prior to measuring said first time interval, said trigger pattern on said storage medium at a desired radial position.

5. The method of claim 4, wherein said desired radial position is equal to said one radial position at which said first time interval is measured.

6. The method of claim 4, wherein said desired radial position is different from said one radial position at which said first time interval is measured.

7. The method of claim 1, wherein said selected criterion comprises a plurality of trigger patterns written on said storage medium, said plurality of trigger patterns having a predefined relationship with one another.

8. The method of claim 7, wherein said predefined relationship comprises a relationship in which a time measured between each of the plurality of trigger patterns and an inertial frame index is substantially constant.

9. The method of claim 7, further comprising writing, prior to measuring said first time interval, said trigger pattern on said storage medium at a desired radial position in which a portion of said plurality of trigger patterns can be read.

10. The method of claim 1, wherein said selected criterion comprises a motor index of a storage device, said storage device comprising said storage medium.

11. The method of claim 10, further comprising:
    taking a plurality of measurements at said one radial position;
    averaging said plurality of measurements taken at said one radial position to obtain said first time interval;
    taking a plurality of measurements at said another radial position; and
    averaging said plurality of measurements taken at said another radial position to obtain said second time interval.

12. The method of claim 1, wherein said selected criterion is another trigger pattern written on said storage medium at a desired radial position.

13. The method of claim 12, wherein said trigger pattern is also written at said desired radial position.

14. The method of claim 13, wherein said desired radial position is equal to said one radial position at which said first time interval is measured.

15. The method of claim 13, wherein said desired radial position is different from said one radial position at which said first time interval is measured.

16. The method of claim 12, further comprising triggering on said another trigger pattern and moving to said another radial position, prior to measuring at said another radial position.

17. The method of claim 16, wherein said measuring comprises triggering on said trigger pattern to measure said second time interval.

18. The method of claim 12, wherein said trigger pattern and said another trigger pattern are written at different radial positions.

19. A method of determining off-track time shift estimates, said method comprising:
    measuring, at one radial position, a first time interval between a selected criterion and a trigger pattern written on a storage medium, wherein said selected criterion comprises a plurality of trigger patterns written on said storage medium, said plurality of trigger patterns having a predefined relationship with one another;
    measuring, at another radial position, a second time interval between said selected criterion and said trigger pattern, wherein said another radial position is at a different track pitch than a track pitch used to write said plurality of trigger patterns; and
    determining an off-track time shift estimate using said first time interval and said second time interval.

20. An apparatus for determining off-track time shift estimates, said apparatus comprising:

a measuring unit adapted to measure, at one radial position, a first time interval between a selected criterion and a trigger pattern written on a storage medium;

said measuring unit being further adapted to measure, at another radial position, a second time interval between said selected criterion and said trigger pattern; and a computing unit adapted to determine an off-track time shift estimate using said first time interval and said second time interval.

21. The apparatus of claim 20, wherein said computing unit is adapted to subtract said second time interval from said first time interval to obtain said off-track time shift estimate.

22. The apparatus of claim 20, further comprising a pattern generator adapted to use said off-track time shift estimate to write subsequent trigger patterns on said storage medium.

23. The apparatus of claim 20, further comprising a pattern generator adapted to write, prior to measuring said first time interval, said trigger pattern on said storage medium at a desired radial position.

24. The apparatus of claim 23, wherein said desired radial position is equal to said one radial position at which said first time interval is measured.

25. The apparatus of claim 23, wherein said desired radial position is different from said one radial position at which said first time interval is measured.

26. The apparatus of claim 20, wherein said selected criterion comprises a plurality of trigger patterns written on said storage medium, said plurality of trigger patterns having a predefined relationship with one another.

27. The apparatus of claim 26, wherein said predefined relationship comprises a relationship in which a time measured between each of the plurality of trigger patterns and an inertial frame index is substantially constant.

28. The apparatus of claim 26, further comprising a pattern generator adapted to write, prior to measuring said first time interval, said trigger pattern on said storage medium at a desired radial position in which a portion of said plurality of trigger patterns can be read.

29. The apparatus of claim 26, wherein said another radial position is at a different track pitch than a track pitch used to write said plurality of trigger patterns.

30. The apparatus of claim 20, wherein said selected criterion comprises a motor index of a storage device, said storage device comprising said storage medium.

31. The apparatus of claim 30, wherein said measuring unit is adapted to take a plurality of measurements at said one radial position and a plurality of measurements at said another radial position, and wherein said computing unit is adapted to average said plurality of measurements taken at said one radial position to obtain said first time interval and adapted to average said plurality of measurements taken at said another radial position to obtain said second time interval.

32. The apparatus of claim 20, wherein said selected criterion is another trigger pattern written on said storage medium at a desired radial position.

33. The apparatus of claim 32, wherein said trigger pattern is also written at said desired radial position.

34. The apparatus of claim 33, wherein said desired radial position is equal to said one radial position at which said first time interval is measured.

35. The apparatus of claim 33, wherein said desired radial position is different from said one radial position at which said first time interval is measured.

36. The apparatus of claim 32, further comprising a transducer adapted to trigger on said another trigger pattern and to move to said another radial position, prior to measuring at said another radial position.

37. The apparatus of claim 36, wherein said transducer is adapted to trigger on said trigger pattern in order for said measuring unit to measure said second time interval.

38. The apparatus of claim 32, wherein said trigger pattern and said another trigger pattern are written at different radial positions.

39. An apparatus for determining off-track time shift estimates, said apparatus comprising:

means for measuring, at one radial position, a first time interval between a selected criterion and a trigger pattern written on a storage medium;

means for measuring, at another radial position, a second time interval between said selected criterion and said trigger pattern; and means for determining an off-track time shift estimate using said first time interval and said second time interval.

40. An article of manufacture, comprising:

at least one computer usable medium having computer readable program code means embodied therein for causing the determining of off-track time shift estimates, the computer readable program code means in said article of manufacture comprising:

computer readable program code means for causing a computer to measure, at one radial position, a first time interval between a selected criterion and a trigger pattern written on a storage medium;

computer readable program code means for causing a computer to measure, at another radial position, a second time interval between said selected criterion and said trigger pattern; and computer readable program code means for causing a computer to determine an off-track time shift estimate using said first time interval and said second time interval.

41. The article of manufacture of claim 40, further comprising computer readable program code means for causing a computer to write, prior to measuring said first time interval, said trigger pattern on said storage medium at a desired radial position.

42. The article of manufacture of claim 40, wherein said selected criterion comprises a plurality of trigger patterns written on said storage medium, said plurality of trigger patterns having a predefined relationship with one another.

43. The article of manufacture of claim 40, wherein said selected criterion comprises a motor index of a storage device, said storage device comprising said storage medium.

44. The article of manufacture of claim 40, wherein said selected criterion is another trigger pattern written on said storage medium at a desired radial position.

45. The article of manufacture of claim 44, wherein said trigger pattern is also written at said desired radial position.

46. The article of manufacture of claim 44, wherein said trigger pattern and said another trigger pattern are written at different radial positions.

* * * * *